US009923956B2

(12) United States Patent
Cahill et al.

(10) Patent No.: US 9,923,956 B2
(45) Date of Patent: Mar. 20, 2018

(54) MESSAGE TRANSFER SYSTEM, METHOD OF TRANSFERRING MESSAGES AND SOFTWARE PRODUCT

(71) Applicant: Webtext Holdings Limited, Dublin (IE)

(72) Inventors: Anthony Cahill, Galway (IE); Colm Keating, Dublin (IE); Frank Slyne, County Dublin (IE); Hugh Kelly, Killiney (IE)

(73) Assignee: Webtext Holdings Limited (IE)

( * ) Notice: Subject to any disclaimer, the term of this patent is extended or adjusted under 35 U.S.C. 154(b) by 0 days.

(21) Appl. No.: 15/072,440

(22) Filed: Mar. 17, 2016

(65) Prior Publication Data

US 2017/0272504 A1    Sep. 21, 2017

(51) Int. Cl.
| H04M 1/725 | (2006.01) |
| H04M 1/663 | (2006.01) |
| H04L 29/08 | (2006.01) |
| G06F 17/30 | (2006.01) |
| H04L 12/58 | (2006.01) |
| H04W 4/14 | (2009.01) |

(52) U.S. Cl.
CPC ........ *H04L 67/10* (2013.01); *G06F 17/30312* (2013.01); *H04L 51/066* (2013.01); *H04L 67/2842* (2013.01); *H04W 4/14* (2013.01); *H04L 51/38* (2013.01)

(58) Field of Classification Search
CPC ... H04L 67/10; H04L 51/066; H04L 67/2842; G06F 17/30312; H04W 4/14
USPC ...................................................... 455/412.2
See application file for complete search history.

(56) References Cited

U.S. PATENT DOCUMENTS

| 7,154,901 B2* | 12/2006 | Chava ..................... H04L 45/00 370/400 |
| 7,738,900 B1* | 6/2010 | Manroa ............... H04L 12/1859 455/3.01 |
| 7,797,010 B1* | 9/2010 | Manroa ............... H04L 63/0892 455/412.1 |
| 7,844,294 B1* | 11/2010 | Manroa .................. G06Q 10/10 455/518 |
| 7,864,716 B1* | 1/2011 | Manroa ............. H04L 29/12594 370/260 |
| 8,284,682 B2* | 10/2012 | Huq ..................... H04L 12/2697 370/250 |

(Continued)

OTHER PUBLICATIONS

International Search Report and Written Opinion for corresponding International application No. PCT/IB2017/051548, dated May 19, 2017.

*Primary Examiner* — Marceau Milord
(74) *Attorney, Agent, or Firm* — Tarolli, Sundheim, Covell & Tummino LLP

(57) ABSTRACT

A message transfer system includes an interface to a send agent, arranged to facilitate an input of an at least one message to the message transfer system, an interface to a delivery agent, arranged to facilitate an output of the at least one message from the message transfer system, a message queue, arranged to facilitate a processing of the at least one message through the message transfer system between the interface to a send agent and the interface to a delivery agent, and a message transfer node, arranged to include the message queue such that the message queue is arranged as distributed.

33 Claims, 13 Drawing Sheets

(56) References Cited

U.S. PATENT DOCUMENTS

| | | | |
|---|---|---|---|
| 2004/0156495 A1* | 8/2004 | Chava | H04L 45/00 379/392 |
| 2004/0196858 A1* | 10/2004 | Tsai | H04L 45/00 370/401 |
| 2006/0056419 A1* | 3/2006 | Eichler | H04L 12/66 370/395.52 |
| 2007/0107059 A1* | 5/2007 | Chasin | H04L 63/126 726/23 |
| 2007/0118616 A1* | 5/2007 | Simongini | H04L 29/12122 709/219 |
| 2007/0123253 A1* | 5/2007 | Simongini | H04L 67/16 455/433 |
| 2007/0136413 A1* | 6/2007 | Ishikawa | H04L 29/06027 709/200 |
| 2007/0244974 A1* | 10/2007 | Chasin | G06Q 10/107 709/206 |
| 2009/0125595 A1 | 5/2009 | Maes | |
| 2012/0166582 A1* | 6/2012 | Binder | H04L 63/18 709/217 |
| 2012/0239413 A1* | 9/2012 | Mathur | G06Q 10/06 705/2 |
| 2014/0201759 A1 | 7/2014 | Amikura | |
| 2015/0365358 A1 | 12/2015 | Strassner | |

\* cited by examiner

| Field | Category | Internal | Final |
|---|---|---|---|
| ConfigBits | Routing | X | X |
| Original Text | Message | X | X |
| Moderated and parsed Text | Moderation, Parsing | X | X |
| Api_id (username) | Authentication | X | X |
| External Message ID | Message ID | X | X |
| Internal Message ID | Message ID |  | X |
| Original Destination | Routing | X | X |
| Eventual Destination | Routing | X | X |
| Method for delivery | Routing | X | X |
| Validated | Status | X | X |
| R2c time | Quality of Service | X | X |
| R2c process | Debug | X | X |
| W2r time | Quality of Service | X | X |
| W2r process | Debug | X | X |
| Master account | Account | X | X |
| Returne URL | Message | X | X |
| Creation time | Message handling | X | X |
| Amount | Rating | X | X |
| MPR error | Moderation, Parsing | X | X |
| Ticket Type | Messaging | X | X |
| L2c time | Quality of Service |  | X |
| L2c process | Debug |  | X |
| Smscid | Routing | X |  |
| TicketQ time | Quality of Service |  | X |
| DLR ID | Message Handling |  | X |
| DLR status | Message Handling |  | X |

FIG. 4

US 9,923,956 B2

MESSAGE TRANSFER SYSTEM, METHOD OF TRANSFERRING MESSAGES AND SOFTWARE PRODUCT

FIELD OF THE INVENTION

The present invention relates to the field of communication applications comprising the use of messaging. Specifically, the present invention relates to a message transfer system, in particular to a message transfer system which allows for intermediate interfacing between a sender and a receiver of messages. Moreover, the present invention concerns a method of transferring messages. Furthermore, the present invention relates to software products recorded on machine readable data storage media, wherein the software products are executable on computing hardware for implementing aforesaid method.

BACKGROUND OF THE INVENTION

Messaging has become a popular communication means, driven (at least in part) by the development and expansion of the internet over recent years. It is now commonplace to be able to directly connect in an instantaneous manner from most locations using mobile devices or leave a message for a recipient, said message arranged possible by various means and in various formats. People communicate more and more frequently by means of mobile phone devices or computers. Even services normally provided by traditional devices, such as a direct telephone call between two people (by means of a traditional landline and fixed handset), can now be implemented using a computer and wireless communication across the internet. However, the traditional phone call is frequently a less preferred option, as the option of sending short messages is perceived as easier and cheaper, as well as becoming more socially acceptable.

The range and availability of messaging applications has rapidly expanded. Such messaging applications include text messaging, such as SMS (Short Messaging System or Service, suitable for short text messages up to a maximum length of characters) or multi media messaging, such as MMS (Multimedia Messaging Service, an extension of core SMS technology which allows for the sending of images, such as photos or videos, for example). Development of messaging applications is often driven by the increasing use of mobile devices, such as portable phones. Instant messaging is available through applications such as Jabber and Skype, which allow for exchange of text and files by internet users using a browser or an instant messaging client, and live chat systems such as LivePerson and Moxie which provide chat functionality in websites, among other uses. Generally speaking, a user of these applications chooses to install a particular application on a (often hand-held, mobile) device and accesses the basic functionality through the device. A user may, further, create an account with a company, such as Jabber, thereby creating a connection in order to access the functionality. The various messaging alternatives are thus accessed by conscious user choice and/or action.

Some companies, such as Twilio, allow the use of their proprietary messaging applications (by mean of an account) in association with, or embedded in, other applications. The user can build-in parts of the Twilio application package as part of their own software product, while maintaining an account relationship with Twilio. A mark-up language dedicated to Twilio is used and it is possible to initiate response to incoming calls or to initiate outgoing calls, for example. The functionality is targeted to provide communication access for sales and mass publicity, for example. The messaging options include SMS, phone calls etc. which can be accessed or connected across different media, such as web or phone connections. Particular language formats and software are available for incorporation into other products. Many of these exist in open source format, available to software developers and other companies, thereby allowing proliferation of the messaging applications. The Twilio product is based on cloud communication techniques to remove the need for reliance on traditional hardware. The cloud essentially acts as one large computing device, with components acting together in unison, each component relying on other components in real time and operational decisions being based on the status of the whole system. The system becomes a global entity, a resource for those connected to it by means of the application.

The implementation of messaging relies on a structure of basic protocols and industry standards. Each messaging system uses a propriety message transfer system to route messages between users. In the case of SMS, these protocols have been traditionally implemented in telecommunications hardware systems. More recently, software-based SMS systems have been developed which implement some, or all, of the SMS protocol in software running on servers. Kannel is an example of such an SMS system implemented in software. In the fullest terms, Kannel operates as a gateway to WAP (Wireless Application Protocol) infrastructure, thereby allowing access to a wider user base. In terms of mobile devices and messaging, it provides an SMS gateway for GSM (Global System for Mobile communications, relating to protocols for cellular networks used by mobile phones) networks. The software is provided as open source and therefore is publically available. Increasingly, development of the internet is driving increasing use of software for communication products.

Both hardware and software approaches are subject to difficulties and problems in implementation.

Hardware based SMS systems require the purchase and operation of dedicated hardware, which is both expensive to purchase and to operate. Moreover, these systems tend to lack functionality and cannot be easily scaled or used to provide new services.

Existing software systems are monolithic i.e. the computing functions all share the same computing resources, such as CPU (central processing unit), disk, memory, and I/O (input/output resources and functionality). For any such system, it is accepted that there are physical restrictions on how large a single platform or cluster (defined as loosely or tightly connected computer systems operating so as to mimic or achieve operation as a single computing entity) can become. In addition, increasing size invariably leads to increasing, prohibitive costs.

Current internet communications systems can scale to run across thousands of processors and can handle customer and traffic volumes several orders of magnitude larger than the largest of SMS systems. This creates a limitation for SMS as the full potential of the technology is not exploited or utilised.

Interfaces for SMS systems are generally restricted to trunk (designed to handle many signals simultaneously and form a node or switching centre in a communication system) and bulk (for batch or large data update) interfaces or to basic web interfaces, such as trunk or HTTP (HyperText Transfer Protocol) interfaces. More modern and frequently implemented protocols include SOAP (Simple Object Access Protocol, used for transfer of structured information in a web access environment which relies on other protocols such as HTTP) and XML (eXtensible Markup Language, defining rules for formatting such that the result is readable by human and machine), for example. Implementation of these modern protocols can be problematic for existing systems and often add overhead to existing systems, due to additional layers of protocol required for implementation and 'non-native' handling requirements for a particular existing system.

Problems associated with existing message transfer options, as outlined above, need to be addressed to improve message transfer and reduce limitations, particularly with regard to message transfer by SMS.

SUMMARY OF THE INVENTION

The present invention seeks to provide an improved message transfer. Moreover, the present invention seeks to provide an improved transfer of SMS messages.

According to a first aspect of the present invention, there is provided a message transfer system as claimed in appended claim 1: there is provided a message transfer system comprising:—
- an interface to a send agent, arranged to facilitate an input of an at least one message to the message transfer system,
- an interface to a delivery agent, arranged to facilitate an output of the at least one message from the message transfer system,
- a message queue, arranged to facilitate a processing of the at least one message through the message transfer system between the interface to a send agent and the interface to a delivery agent, wherein,
the message transfer system further comprises a message transfer node, arranged to comprise the message queue such that the message queue is arranged as distributed.

The invention is of advantage in that it provides an easily scalable, fast and efficient message transfer system.

Advantageously, such segments of system architecture i.e. components comprising a distributed message queue, at the message transfer node, facilitate the message transfer system to meet appropriate levels of criticality, responsiveness and responsibilities.

Advantageously, when system architecture is arranged across bounds of any one system part, the potential to allow the message transfer system to grow into many systems, thereby assisting effective scaling. This is especially the case for the message queue but such scaling can be applied to other modules.

Optionally, the message transfer system comprises that the message queue is arranged as distributed across a plurality of physical and/or virtual servers, optionally arranged as located across disparate geographical domains.

Optionally, the message transfer system comprises that the interface to a send agent and/or the interface to a delivery agent are arranged located on the message transfer node.

Optionally, the message transfer system comprises that the interface to a send agent is further arranged to facilitate the output of a message from the message transfer system.

Optionally, the message transfer system comprises at least one of: an operations support system, a balance management, a business support system, a system control.

Optionally, the message transfer system comprises that the system control is arranged capable of stopping, starting and monitoring of all subsystems within the message transfer node.

Optionally, the message transfer system comprises that the message transfer node further comprises a persistent memory based database, arranged capable of accepting and storing at least one data input from the operations support system comprised in the message transfer system.

Optionally, the message transfer system comprises that said at least one data input comprises provisioning data, critical for a functioning of a messaging service of the message transfer system.

Optionally, the message transfer system comprises that said provisioning data comprises at least one of: authentication data, message rating data, routing data, balance and/or credit information.

Optionally, the message transfer system comprises that the message transfer node is arranged capable of short-term autonomous operation based on the at least one data input.

Optionally, the message transfer system comprises a plurality of message transfer nodes, optionally arranged as a group, each message transfer node being further arranged as individually cooperative with the message transfer system and independent of each other.

Optionally, the message transfer system is arranged to facilitate allocation of a preferred message transfer node comprised in the plurality of message transfer nodes, according to a system user preference.

Optionally, the message transfer system comprises that the message queue is arranged as distributed across the plurality of message transfer nodes.

Optionally, the message transfer system comprises that the interface to send agent is further arranged to comprise a first translator, arranged capable of translating an input format of the at least one message to a JSON object after the input to the message transfer system and/or arranged capable to translate the JSON object to an output format before the output of the at least one message from the message transfer system.

Optionally, the message transfer system comprises that the interface to delivery agent is further arranged to comprise a second translator, arranged capable to translate the JSON object to an output format before the output of the at least one message from the message transfer system. Optionally, the input format is not the same as the output format.

Advantageously, these options facilitate low latency in the system at the message transfer node and facilitate a speedy message transfer process.

Advantageously, such interim formatting to a JSON object, optionally according to a unique protocol suitable and optimised for message transfer at the message transfer node, permits the format of an input message to be changed so that the message is easily delivered in a different format.

According to a second aspect of the invention, there is provided a method of transferring messages, as claimed in appended claim 16: there is provided a method of transferring messages comprising the steps of:—
- facilitating an input of at least one message to the message transfer system by means of an interface to a send agent;
- facilitating an output of the at least one message from the message transfer system by means of an interface to a delivery agent;
- processing of the at least one message by means of a message queue through the message transfer system between the interface to a send agent and the interface to a delivery agent;
- providing a message transfer node comprising the message queue;
- arranging the message queue as distributed.

Advantageously, such segments of system architecture i.e. components comprising a distributed message queue, at the message transfer node, facilitate the message transfer system to meet appropriate levels of criticality, responsiveness and responsibilities.

Advantageously, when system architecture is arranged across bounds of any one system part, the potential to allow the message transfer system to grow into many systems, thereby assisting effective scaling. This is especially the case for the message queue but such scaling can be applied to other modules.

Optionally, the method further comprises the step of:—
arranging the message queue as distributed across a plurality of physical and/or virtual servers, optionally arranged as located across disparate geographical domains.

Optionally, the method further comprises the step of:—
arranging the interface to a send agent and/or the interface to a delivery agent as located on the message transfer node.

Optionally, the method further comprises the step of:—
arranging the interface to a send agent to facilitate the output of a message from the message transfer system.

Optionally, the method further comprises the step of:—
arranging the message transfer system to further comprise at least one of: an operations support system, a balance management, a business support system, a system control.

Optionally, the method further comprises the step of:—
arranging the system control capable of stopping, starting and monitoring of all subsystems within the message transfer node.

Optionally, the method further comprises the step of:—
arranging the message transfer node to further comprise a persistent memory based database, arranged capable of accepting and storing at least one data input from the operations support system comprised in the message transfer system.

Optionally, the method further comprises the step of:—
arranging said at least one data input comprising provisioning data, critical for a functioning of a messaging service of the message transfer system.

Optionally, the method further comprises the step of:—
arranging said provisioning data to comprise at least one of:
authentication data, message rating data, routing data, balance and/or credit information.

Optionally, the method further comprises the step of:—
arranging the message transfer node capable of short-term autonomous operation based on the at least one data input.

Optionally, the method further comprises the step of:—
arranging the message transfer system to comprise a plurality of message transfer nodes, optionally arranged as a group, each message transfer node being further arranged as individually cooperative with the message transfer system and independent of each other.

Optionally, the method further comprises the step of:—
arranging the message transfer system to allocate a preferred message transfer node, according to a system user preference.

Optionally, the method further comprises the step of:—
arranging the message queue as distributed across a plurality of message transfer nodes.

Optionally, the method further comprises the steps of:—
translating, by means of a first translator at the interface to send agent, an input format of the at least one message to a JSON object after the input to the message transfer system;
progressing the JSON object through the message transfer node;
translating, by means of the first translator at the interface to send agent or by means of a second translator at the interface to delivery agent, the JSON object to an output format before the output of the at least one message from the message transfer system.

Optionally, the method further comprises that the input format is not the same as the output format.

Advantageously, these options facilitate low latency in the system at the message transfer node and facilitate a speedy message transfer process.

Advantageously, such interim formatting to a JSON object, optionally according to a unique protocol suitable and optimised for message transfer at the message transfer node, permits the format of an input message to be changed so that the message is easily delivered in a different format.

According to a third aspect of the present invention, as claimed in appended claim 31, there is provided a software product recorded on machine readable data storage media, characterized in that the software product is executable upon computing hardware for implementing a method pursuant to the second aspect of the invention, as claimed in any one of claims 14 to 30.

It will be appreciated that features of the invention are susceptible to being combined in any combination without departing from the scope of the invention as defined by the appended claims.

DESCRIPTION OF THE DIAGRAMS

Embodiments of the present invention will now be described, by way of example only, with reference to the following diagrams wherein:

FIG. 4 is an illustration of message ticket information, according to an embodiment of the present invention;

Figure 1A:
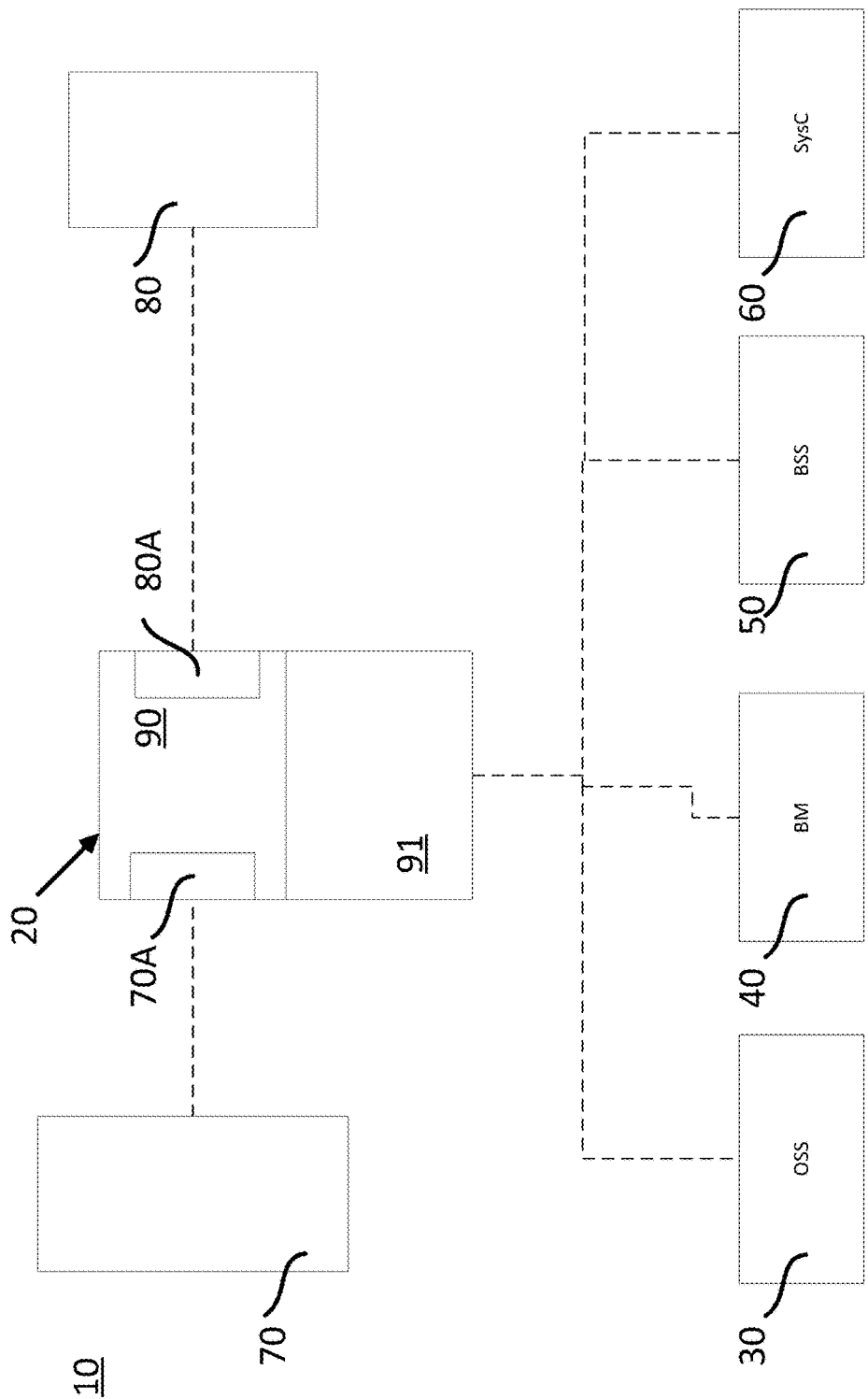
FIG. 1A is an illustration of a message transfer system (MTS) according to an embodiment of the present invention comprising a single message transfer node (MTN)

In the accompanying diagrams, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing. Where appropriate, reference numerals are maintained consistently across the figures.

DESCRIPTION OF EMBODIMENTS OF THE INVENTION

FIG. 1A is an illustration of a message transfer system (MTS) according to an embodiment of the present invention comprising a single message transfer node (MTN). In FIG. 1A, a message transfer system (MTS) is indicated generally by 10. The system 10 includes a message transfer node 20, an operations support system (OSS) 30, a balance management (BM) 40, a business support system (BSS) 50, and a system control (SysC) 60. Further, the MTS 10 comprises an interface 70, to facilitate connection of the MTS to e.g. a send agent or user, and/or an interface 80, to facilitate connection to a delivery agent, such as a mobile network. The MTN node 20 is provided with corresponding interfaces 70A 80A to facilitate direct communication between the MTN and the send agent and/or delivery agent. Thus the MTN 20 is arranged capable of communication either independently, via its own interfaces 70A 80A or by means of the system interfaces 70 80. Interfaces 70 70A 80 80A are optionally implemented as multiplexed interfaces. The MTN 20, according to this specific embodiment of the present invention, further comprises a Message Queue (MQ) 90 and a Persistent Memory Based Database PMBD 91.

Detailed description of the operation of these various parts of the message transfer system 10 will be given below. The dashed lines shown in the figures indicate an association between components, not necessarily a physical connection.

The message transfer system 10 is designed to transfer messages between a sender and receiver by means of interfaces to the system. For example, a message to be sent arriving either at interface 70 of the MTS 10 or at interface 70A located on an MTN 20 is transferred through the MTN 20 and output either at an interface 80A (or subsequently interface 80) which is arranged connected to at least one delivery agent, such as a mobile network or returned after processing to one of interfaces 70 70A for delivery to a different application. Said incoming message may originate from a third party or other application/system (a send agent). Interfaces 80 80A are then capable of delivering a processed message, e.g. for the purpose of forwarding said message to another third party or other application/system (a delivery agent). In order to effectively transfer the message on behalf of the MTS 10, the MTN 20 of the message transfer system 10 acts as an intermediate destination. Ideally and advantageously, according to embodiments of the present invention, the message is highly transient at the MTN 20. This facilitates speed of transfer, high efficiency and large capacity of the system.

Processing of the message by the MTS 10 is accomplished at the MTN 20, which receives input and/or information from the other system components in order to achieve its task. The MTN 20 can be thought of as the 'message engine' of the MTS 10. The MTN 20 is also arranged capable of outputting information back to other system components. According to an embodiment of the present invention, the MTN 20 may act autonomously with respect to the processing of the message, having previously received necessary information and input from other components of the MTS system 10 and facilitating message input and output by means of interface 70A and/or 80A. Depending on the chosen business model, the timeframe over which the MTN 20 may act autonomously can range from a short time period of a few minutes to a longer time period, preferably no longer than up to one day or a few days. Advantageously, this allows for continued operation in the event of system or communication failure(s) in other parts of the MTS 10. Optionally, by way of further advantage, such a lack of connection to the main system 10, by way of autonomous operation, may also be arranged to facilitate additional security against attacks to the system, as access to a MTN 20 in isolation would not allow an attacker to gain access to all account information associated with a user, customer or client. In short, the MTN may be said to operate a "core service" of the message transfer system 10, based on "need to know" information only.

The MTN 20 can be regarded as a physical node where many servers are comprised in the node but these hardware elements are not necessarily co-located. Similarly, the MTN 20 can also be considered as a (defined) logical object where the functionality is provided by multiple hardware components, which look and act as if embodying one device or object. The Message Queue 90 is similarly regarded and implemented. Said MQ 90 can be split between a plurality of servers. This may be arranged as a splitting of the MQ across multiple physical or virtual servers for a single MTN 20. Should a plurality of MTN nodes be present in the system 10, as shown below, the message queue is also susceptible to being split between MTN nodes. This can be expressed as splitting the MQ to run across multiple distributed servers. Such arrangement and functionality is sharply in contrast with known systems where a single message queue services the messaging system and may even become a bottleneck for input into the messaging system.

Figure 1B:
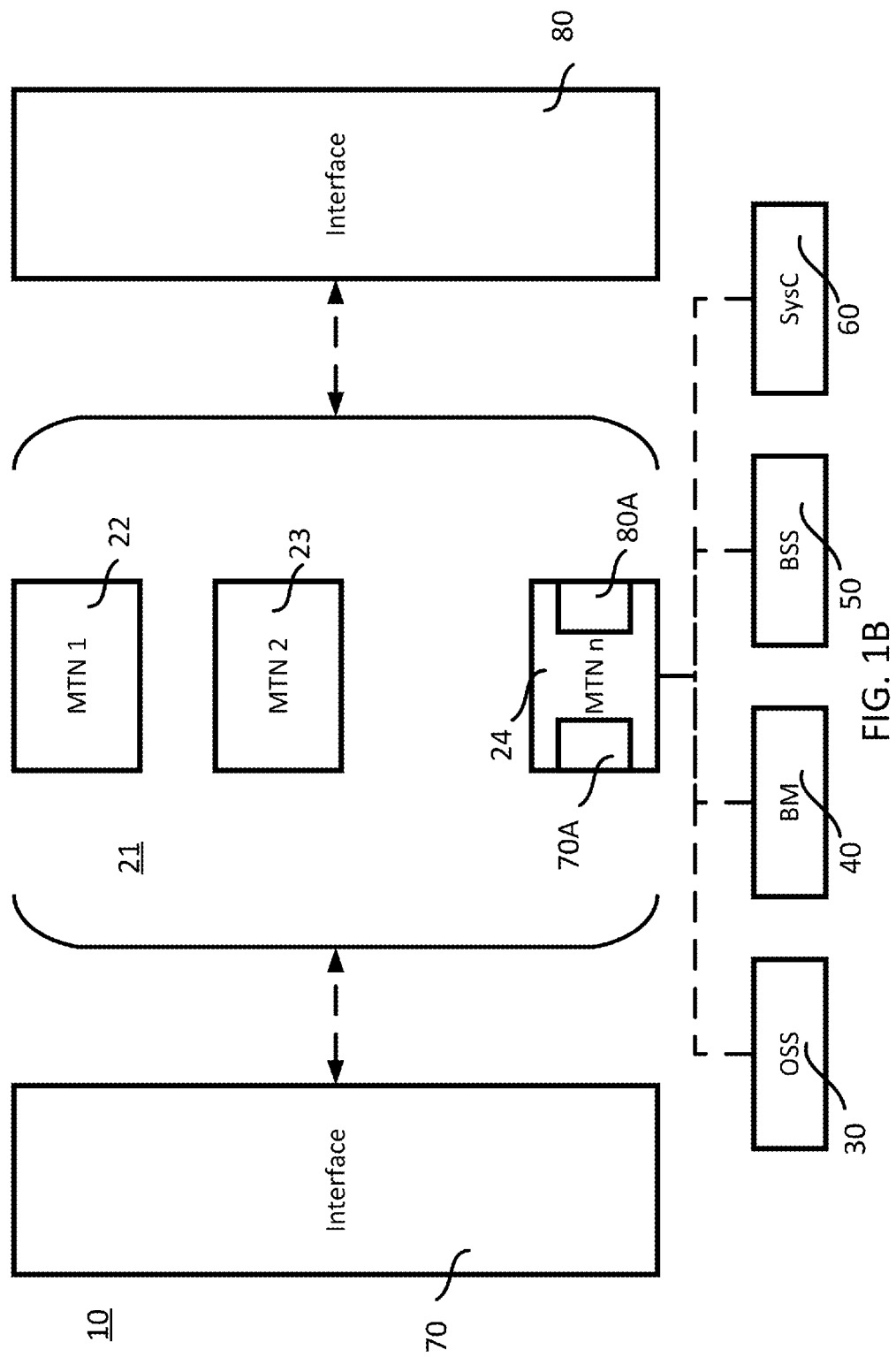
FIG. 1B is an illustration of a message transfer system (MTS) according to an embodiment of the present invention comprising a plurality of message transfer nodes (MTN's)

FIG. 1B is an illustration of a message transfer system 10 according to an embodiment of the present invention comprising a plurality of message transfer nodes (MTN's).

In this embodiment of the present invention, there is shown a group 21 of MTN's 22 23 24 numbered from 1, 2 . . . up to a number n, respectively, which may be any number as required depending on demand or system design. It should be noted that each MTN in the group 21 is associated with each of the system components 30 40 50 60 in an individual and independent manner, as described previously for MTN 20 of FIG. 1A. Interfaces 70 80 are optional to the system 10, as before. That is to say, the individual MTN devices 22 23 24 are not arranged to connect with each other, each node standing alone from its peers (as shown in FIG. 1B). Each MTN is equipped with at least one interface 70A 80A, as illustrated for MTN n 24.

Advantageously, the MTS 10 is highly scalable, the MTN group 21 being easily augmented by the addition of a further MTN device as needed. This is particularly difficult to achieve according to conventional systems, which reply on conventional computing or conventional hardware for scaling. The capacity of an MTN 20 22 23 24 depends on the exact characteristics of the node itself but for current implementations (to be described in more detail later), a global coverage of the MTS 10 can be handled by an arrangement of between 1 and 3 nodes, envisaged as fewer than 5 MTN nodes on expansion of the current system. Each MTN is arranged as flexible and scalable, as described below. Nevertheless, the actual number of said MTN nodes is not limited by hardware, system management or construction, assisted by implementation of embodiments of the current invention with respect to method of operation and method of message transfer, as elucidated further below.

The Message Transfer System (MTS) 10, comprises a single MTN 20 or is the aggregate (or group 21) of multiple Message Transfer Nodes 22 23 24, each of which is shown here to operate autonomously and arranged capable to perform the delivery and receipt of large volumes of short message (SMS) transactions, as necessary. Further description of the MTN functionality refers to both single 20 22 23 24 or group 21 MTN nodes.

The Message Transfer System 10 is usually, but not necessarily, distributed across disparate geographical domains. The provision of multiple nodes allows customers to connect to and send messages through a preferred Message Transfer Node, for example MTN 2 23, but also to connect and send through any other Message Transfer Nodes 22 24 within the group 21 and system 10 architecture. Each MTN 20 22 23 24 is also responsible for the real-time functions of validating an individual message's source, destination and route information. Components within the MTS 10 system architecture are grouped into segments, which are designed to meet appropriate levels of criticality, responsiveness and responsibilities. In order to meet increased customer and traffic demands, traditional monolithic messaging systems (based on either hardware or software principles) are constrained by how big a single system can be built. The system architecture, according to embodiments of the present invention, is distributed beyond the bounds of any one system, potentially allowing the system to be grown into many systems.

The architecture according to embodiments of the present invention is modular, allowing the adoption of best practice in operational and development controls, and application of resources, for example in unit testing and system testing. Said modularity also facilitates targeted or selective scaling when required.

The function of the MTN node 20 22 23 24 is to conduct the routing, rating, authentication of messages through the system, and, ideally, purely for the duration of time needed for the message to be transmitted. Its role is not to manage customer configuration. To this extent and for this purpose, the MTNs 20 22 23 24 rely on other components 30 40 50 60 to manage and convey information about customer configuration and message rule-sets, where defined. While there may be many MTN's in the overall architecture, it is envisaged there is logically only one subsystem each for Operations Support (OSS) 30, Business Support (BSS) 50, System Control (SysC) 60 and Balance Management (BM) 40. This provision is to ensure efficiency and accuracy of information and flexibility of operation with respect to the different MTNs.

The OSS 30 manages the provisioning of data out to the MTN's 20 22 23 24 that is critical for the functioning of the messaging service to be provided by the message transfer system 10. This includes data for authentication, message rating and routing. In the event the MTN 20 22 23 24 becomes disconnected from the OSS system 30, it can operate independently for a period of time. In a preferred embodiment of the present invention, the balance information provides enough financial float (or effective money reserve or (predetermined) credit for implementation of an effective customer usage limit) for accounts to be authorized for (preferably) up to 1 day of autonomous usage by the node. The length of time an MTN is arranged for autonomous functioning is not necessarily limited by the MTN itself or by a pre-determined timeframe (although such options can be implemented). Rather, in a preferred embodiment of the present invention, the MTN is constrained by the actual usage by one or more customers or users during said length of time, in combination with the amount of float or credit arranged as available. In other words, the MTN can be arranged to function autonomously until the available money runs out—this may be for a single customer or all possible customers. The float itself can be determined e.g. by consideration of normal use for a user or customer. Thus different specific floats can be made available, tailored to customer needs. Once the MTN 20 22 23 24 and the OSS 30 reconnect, the usage data is preferably transferred from the MTN 20 22 23 24 to the BSS 50 system and a revised balance is provided for each MTN 20 22 23 24 node in the system architecture.

Each MTN 20 22 23 24 is arranged capable of retaining a local Balance for all user accounts (i.e. financial information relevant to the providing of a message transfer service), which is synchronised with the authoritative Balance for users accounts held on a centralised BSS database (not shown) comprised in the BSS 50. User accounts are therefore necessary for use of the message transfer system but the user (be that a private individual or another provider of services) does not have to implement any action beyond registration and payment. This is not arranged via an MTN, the MTN merely accepts relevant information from the administration and business facilities of the MTS 10. In other words, the administration for a user is handled by the main system whereas the message transfer can be implemented by interfacing with either the main system and then an MTN, or directly to an MTN, once the first registration has been effected. (Note that no specific application e.g. software application, needs to be downloaded or activated, contrary to many service provisions comprised in the state of the art). This has two benefits. Firstly, this allows users to transfer messages through any MTN node, which might be required when the route to their primary MTN becomes unavailable or the primary MTN goes off-line. Secondly, to prepare for instances where, while the MTN functions correctly in handling the customer's traffic, the connectivity between the MTN and the authoritative BSS database fails. The MTN 20 22 23 24 is here arranged as having the capability of calculating the rating of all messages, in real time, independent of the centralised BSS database.

The BSS 50 manages overall business data associated with the services, this comprises e.g. customer and service provision data, as well as the storage of message ticket information (to be discussed later).

The system control (SysC) 60 provides functions for the stopping, starting and monitoring of all subsystems within the MTN nodes. This may be achieved by various control means but one possible implementation is shown in FIG. 1C.

Messages enter the message transfer system 10 by interface 70 or the MTN 20 22 23 24 interface 70A from a number of sources over a number of possible protocols. A MTN 20 22 23 24 is arranged to provide access by at least one comprised interface 70A or a single 70 or plurality of interfaces (not shown) of the MTS 10 to which these requests can be addressed, including, but not limited to, HTTP(S) (a Secure version of the Hyper Text Transfer Protocol), SMPP (Short Message Peer-to-Peer protocol), XMPP (eXtensible Messaging and Presence Protocol), SMTP (Simple Mail Transfer Protocol), REST (Representational State Transfer), SOAP (Simple Object Access Protocol). Messages are placed in a Message Queue 90, details provided below and with reference to FIG. 1C. Each MTN 20 22 23 24 comprises its own Message Queue.

Figure 1C:
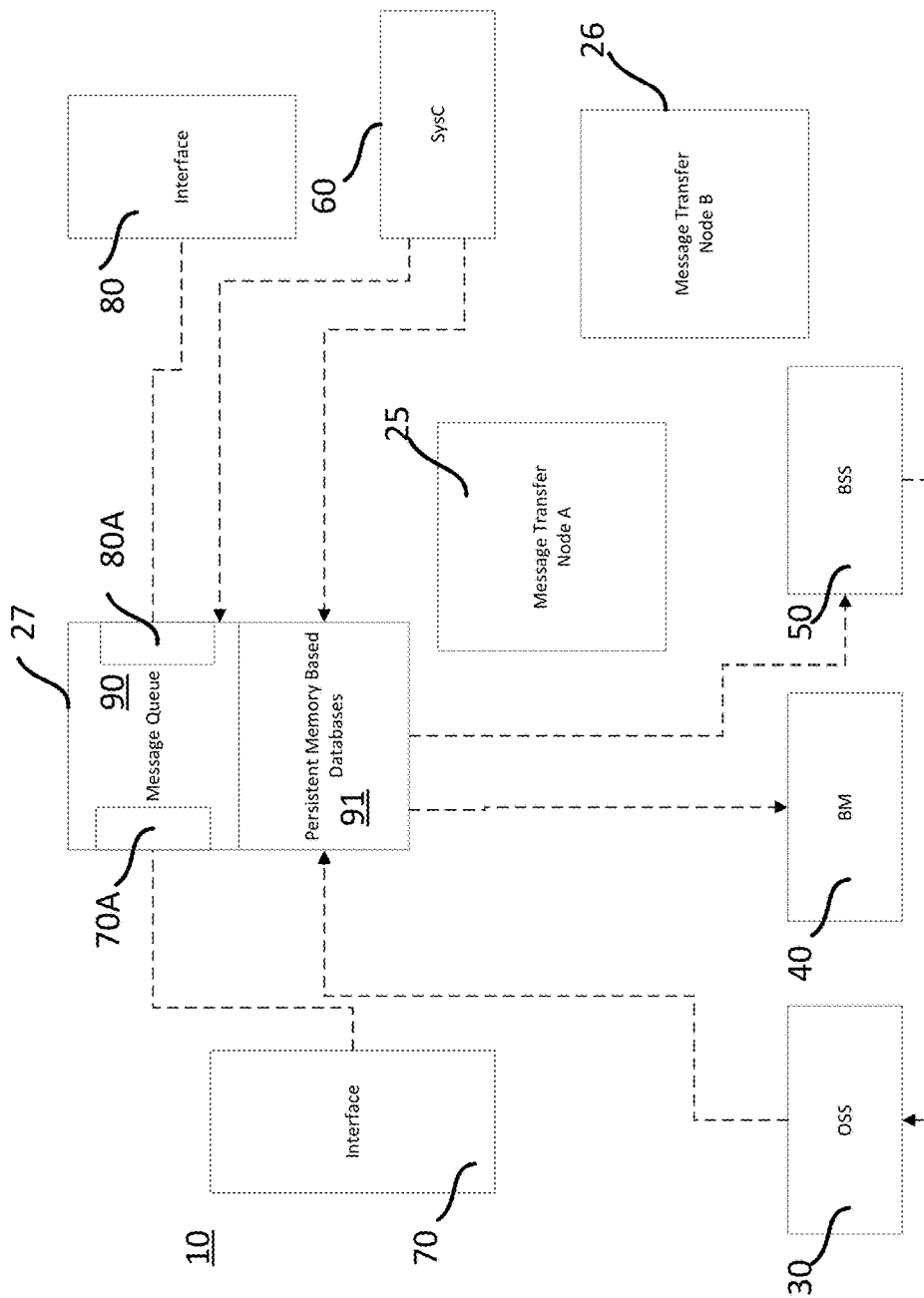
FIG. 1C is an illustration of a message transfer system (MTS) according to an embodiment of the present invention comprising a plurality of message transfer nodes (MTN's)

FIG. 1C is an illustration of a message transfer system 10 according to an embodiment of the present invention comprising a plurality of message transfer nodes (MTN's), MTN A 25 and MTN B 26 and MTN C 27. These nodes are similar to the MTN components as described above. MTN C 27 is shown in FIG. 1C as comprising a MQ 90, a PMBD 91 and interfaces 70A 80A. All other MTNs 25 26 further comprise such components 90 91 70A 80A. MTNs A, B and C 25 26 27 do not communicate with each other but do communicate, as individuals, with the MTS 10 system components 30 40 50 60. Optionally, each MTN may connect to MTS interfaces 70 80. The relationship between an individual MTN 27 and the MTS 10 at large is described below. This description also applies to any other MTN node present 25 26 even through the connections are not shown as specifically illustrated on the FIG. 1C.

MTN C 27 is arranged to co-operate with the OSS (static provision, explained below) 30 from which information can be loaded into a persistent memory based database (PMBD) 91, itself co-located with the Message Queue 90 on the MTN 27. MTN C 27 is further arranged directly co-operating with BM 40, BSS (comprising accounting and logging functions) 50 and SysC (comprising start, stop, reload functions) 60. When the MTN 27 is connected to the MTS 10, information pertaining to messaging functions and results is arranged to be downloaded from the PMBD 91 to the BM 40 and the BSS 50. Such downloading of information allows the MTS 10 to stay up to date and current with operations. In particular the BSS 50 is arranged to relay balance information to the OSS 30 for update. Current information can then be shared from the OSS 30 to all nodes 25 26 27. MTN 27 can be arranged to receive control instruction from SysC 70, which may be specific to a particular module of the MTN, such as the MQ 90 and/or PMBD 91. Said instructions may comprise start/stop operations etc. The dashed lines of FIG. 1C illustrate the flow of information and instructions as outlined above. This illustration should not be considered as limiting for the system operation, as the figure comprises depiction of relationships specific to the MTN and its operation only.

A send agent interface 70 inputs requests directly to the Message Queue 90 and the Message Queue 90 is shown here, for this particular embodiment of the present invention, as further interfaced to the delivery agent interface 80 as output. (More usually in implementation, the message would arrive at the MTN itself and the interface comprised in the MTN 70A would be utilised as the sender's messaging application binds to the MTN). An incoming message or message load may optionally be diverted, in the specific embodiment shown in FIG. 1C, to a chosen MTN 25 26, either as a result of preference or as a result of a load management of the message transfer system 10.

Optionally, it can be arranged that the send agent interface 70 70A or Sending Agent, i.e. the requestor to send a message, can schedule an absolute time or date when a message can be delivered. Four preferred formats are normally implemented. In the following, % Y specifies a four digit Year, % m specifies a two digit month number, % H specifies a two digit Hour, % M specifies a two digit Minute and % S specifies a two digit second. Formats one to four are expressed as:—
1. attime=% Y-% m-% d % H:% M:% S for example attime=2015-04-01:13:10:03
2. attime=% Y-% m-% d % H:% M for example attime=2015-04-01:13:10
3. attime=% Y-% m-% d for example attime=2015-04-01
4. attime=% Y % m % d % H % M % SZ for example attime=20150401131003Z An additional option, of constraining the message to be delayed until the start of the next working day, is implemented according to further embodiments of the present invention. This feature allows messages to be sent to the MTN system at any time of day or night but delivery will only be effected at hours of the day appropriate for businesses. Rules are predefined to further specify required delivery times.

A Load-Balancer (not shown), comprised in the Balance Management (BM) 40, is optionally arranged to perform mediation between the external service point (e.g. a mobile device from which an SMS originates) and the internal service modules (of the message transfer system 10) which are preferably arranged tuned to the particular service protocol that the customer is using. Currently, these protocols include HTTP, HTTPS, XMPP, SMPP, SOAP and XMLRPC (a remote procedural calling protocol using XML for call coding and HTTP as a transport mechanism). Some services predominantly listen for incoming service connections off a nominated transport layer (either TCP, Transport Connection Protocol, or UDP, User Datagram Protocol, virtual connections) port address. For resilience, there are multiple copies of these services per physical server, of which there can be one or many servers. In order to scale horizontally, these services are positioned behind a load balancer which distributes traffic in an equitable manner. If one of the service entities becomes unavailable, the load balancer does not transmit traffic to this service entity. Service entities are stateless and can fail without loss of data or loss of availability of the overall service. Data from incoming connections is generally passed to the (optionally centralized) message queue 90, or stored in a distributed database.

Generic Sender_to_MQ (sender to message queue 90) components, not shown in the figure but comprised in a message transfer node (MTN) 20 22 23 24 25 26 27, carry out a number of pre-processing checks and manipulations of the inbound, usually multiple, requests. The checks include but are not limited to, validating request content and format, authentication of the sending agent i.e. the direct origin of the message, throttling checks (i.e. control of access to MTN by type or specific user or customer, as desired, which are arranged to prevent abuse of the MTS or MTN as a form of security), credit checks where required. Upon completion of said pre-processing checks, the Sender_to_MQ component takes the requested message parameters, packages them, together with the CBM (ConfigBits Mask), timestamp and other account-related elements, into a JSON (JavaScript Object Notation) object. This object is then submitted, over AMQP (Advanced Message Queuing Protocol) to the core Message Queuing component, which is optionally implemented as middleware.

By implementation of embodiments according to the present invention, the translation function based on propriety and unique formatting of incoming messages into said JSON object and translation of outgoing messages from said JSON object into appropriate format for delivery, the passage of the message through a MTN node can be optimized and accelerated. The translation function into and from a JSON object is a highly preferred implementation of embodiments of the present invention. However, this should not be considered as limiting, as other formats or attribute values for data, such as XML, are suitable for implementation. Conventional systems operate less flexibly with layers of interacting protocols having to be accounted for in a complex manner.

Optionally, an incoming message may be tagged for delayed delivery. In this case, the message can be stored optionally in the Persistent Memory Based Database (PMBD) 91. The PMBD 91, is preferably stored on a server separate to the other components of the system. (A copy of the contents of this database is preferably stored on each MTN of the message transfer system, if desired or necessary in a redundant manner, so that the MTN has required information for autonomous operation, should the connection between it and the PMBD be broken at any time). Delayed delivery can specify a future date and/or time, optionally with a preferred granularity of one second, or it can specify a business time rule, such as delivery at the start of the next business day. Since an incoming (optionally named parent) message may have multiple recipients, a distinct route and rating is calculated for each of these possible recipients and the resulting individual messages are (optionally named) child messages. Tickets may be allocated to individual messages, of any kind, for identification. From this point onwards, the child tickets are routed separately to their intended destination. An Initial ticket is created for each child ticket. A child ticket refers to its originating message by inclusion of a parent ticket ID (identifier). (Message tickets are discussed below, with reference to FIG. 4).

Carrier Gateway processes (not shown), comprised in the MTN 20 22 23 24 25 26 27 function, handle both outgoing and incoming messages from e.g. Carriers (not shown). The delivery interface 80 is used as an output destination for a message passing through a MTN and is often a Carrier handling SMS communications to which a third party receiver has subscribed. Said Carriers may optionally respond with a message of their own, directed back towards the MTN 20 22 23 24 25 26 27 and thereby the MTS 10. Outgoing (short) messages are taken from the MTN Message Queue (not shown) and passed to the carriers or the delivery interface 80. The messages are normally sent to the external Carriers using a bulk transmission protocol appropriate to that Carrier but there is no limitation to do so. Usually this protocol is SMPP; however, HTTP is common also. There are distinct processes and queues for each Carrier, arranged and defined within the MTN.

Incoming messages to the MTN 20 22 23 24 25 26 27 from Carriers can comprise both Mobile Originated (MO) messages and Delivery Receipt (DR) messages. Delivery Receipt messages frequently comprise fields relating to delivery status and a unique message ID. Said message ID is used to arrange a match with the outgoing message from the MTN, and is often used to close off the Message Ticket at the MTN side. The delivery status will indicate the success or failure of delivery of the e.g. SMS message. Mobile Originated (MO) messages, which normally have been generated by Mobile devices, are pushed onto the Message Queue for further processing by the Proxy Agent subsystem (not shown) comprised in the MTN, as explained below.

A centralised storage, optionally the PMBD 91, is employed by the MTN 20 22 23 24 25 26 27 (or more frequently) MTS 10 for message tracking. This allows the reconciliation of messages sent out with receipt information received from carriers, even when said events occur on different instances of the Carrier Gateway, which may be implemented as a processor. The MTN and MTS are arranged such that the systems act with as low latency as possible. That is to say, embodiments of the present invention are arranged to facilitate speed of operation, essentially as fast as the message queue can operate, so as to avoid formations of bottlenecks at specific components during operation.

More detailed description of the MTNs and how the nodes perform at a high level and in a distributed fashion will now be addressed. Each MTN 20 22 23 24 25 26 27 has a logical Message Queue (not shown) for transferring messages and an in-memory database (not shown) for storage of message state and logging of tickets. While all messages pass logically through the central Message Queuing 90 system(s), the Message Queue 90 can be arranged as split across many platforms, while maintaining the effective processing of messages within and across the boundaries of the Message Queuing system arrangement. The Message handling capability of the system can be scaled linearly by adding more processing power and memory. In modern, high performance messaging systems, most messages are transient, in that as soon as they are accepted by the system, they are immediately transferred out of the system to the receiving system or their agent. Such systems should be low-latency, in that data should not hit electro-mechanical devices such as hard-disk drives, only where messages need to persist on account of delay or non-delivery of messages. In the architecture of the message transfer system 10 of embodiments of the present invention, preferably, high-performance memory based databases are used, with a default to physical disk, e.g. PMBD 91, where persistence is required.

In a high level logical view of a MTN 20 22 23 24 25 26 27, the MTN is logically split between the MQ 90 which is transactional (i.e. dealing with transient message handling) and the "Redis" (or a similar data structure (e.g. PMBD 91) within the memory dealing with persistence, format etc.) layers which provides persistence and state information.

Message Queuing middleware is frequently utilised to provide for central queueing. Logically, there is one Queuing system, however, physically it can be one or more servers clustered together. Queues can be preferably arranged as mirrored across several machines (i.e. Message Queue functionality or software can be shared or distributed across multiple pieces of hardware) in a cluster, ensuring that even in the event of failure of a machine node that no messages are lost. Queues and Messages can be optionally marked as persistent, so while the majority of nodes exchange messages within memory, there is preferably arranged one (optionally, nominated) node that flushes messages to disk. In the event of power failure, messages can be reclaimed from disk e.g. PMBD 91. The benefit of using a Message Queue is that it is fast and transactional. A distinct queue is preferably created for each route, for delivery by a particular carrier (or receiver or delivery agent). Distinct statistics, metrics and controls are preferably maintained for each route. These comprise e.g. the number of attached consumers and producers, and/or the current and maximum throughput of messages received and transmitted.

Figure 2:
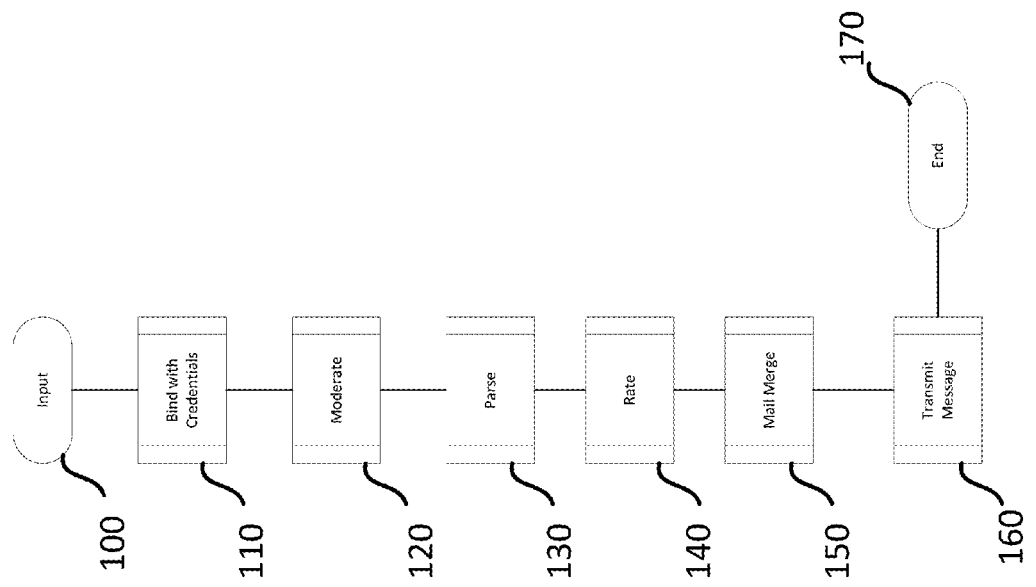
FIG. 2 is an illustration of steps of a method of employing the system of FIG. 1, A to C, a method of message transfer from a sender to a recipient by means of a MTN according to an embodiment of the present invention.

FIG. 2 is an illustration of steps of a method of employing e.g. a system of FIG. 1 (A to C). Specifically, the method comprises message transfer from a sender to a recipient by means of a MTN according to an embodiment of the present invention.

Figure 3:
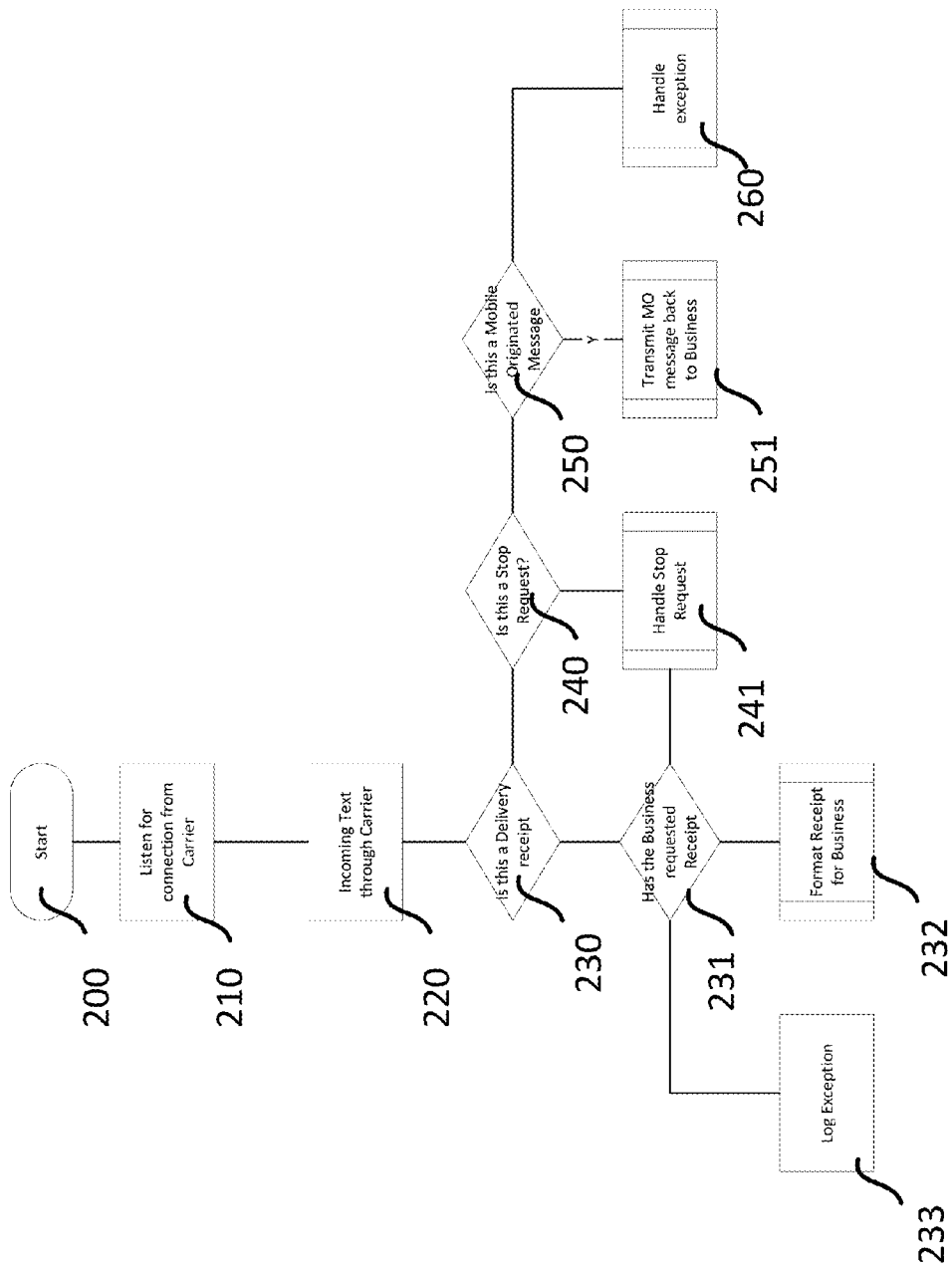
FIG. 3 is an illustration of steps of a method of employing the system of FIG. 1, A to C, a method of message transfer from a recipient back to a MTN according to an embodiment of the present invention.

FIG. 3 is an illustration of steps of a method of employing e.g. the system of FIG. 1 (A to C). Specifically, the method comprises message transfer from a recipient back to a MTN according to an embodiment of the present invention.

Referring to FIG. 2, the system 10 functions in a manner as defined by steps of a method whose steps are illustrated. In a first step 100, a send message is input to the message transfer system 10, either by means of a system interface 70, from which the message can be relayed to an MTN 20 22 23 24 25 26 27, or directly to an MTN by means of a comprised interface 70A. The message is subject to administration by the Message Queue 90 and is diverted to PMBD 91 when appropriate. Subsequent steps comprise various processes, which may be completed in an alternative sequence if desired: the sender gains access to the MTN by a pre-arranged recognition, i.e. bind with credentials 110; the message is then assessed and formatted—moderate 120, parse 130, rate 140—before being assembled into one entity, mail merge 150; the MTN actions transmit message 160 before an end 170 of the process. The message has been sent to the recipient. The processes themselves are preferably arranged as repeatable, fixed steps with no adjustment to the flow or service possible within the MTN. However, it is possible to regard the order of implementation of the processes as a choice and the arrangement of the MTN as comprising some flexibility of set-up. For example, one or more of the processes described above may be regarded as optional, e.g. mail merge 150. A modular and distributed approach throughout the MTS system facilitates responsiveness and flexibility towards different operating conditions. Advantageously, in the management of the system resources, the response of the MTS can be an extension of an individual step or process such that said step or process does not become a system bottleneck. A selected extension is preferably arranged implemented with regard to the optimum response of the system to maintain a fast response and low latency in message transfer.

The various steps in a traverse of a message 100 from the sender to the recipient via a MTN are now discussed in more detail. A sender's messaging application attempts to bind to a MTN node, through validation of their credentials 110. These credentials were issued to the sender in advance, by means of an account set-up for example. In the event of the credentials being incorrect, the sender is allowed to retry (if so desired this can be arranged as a limited number of attempts and/or a blacklisting function can be implemented preventing access to the message transfer system for a predetermined length of time). Successful authentication of the sending agent (normally achieved by an Authentication Module, not shown, usually comprised in the MTN) will return from the persistence database, e.g. PMBD 91, the CBM (Config Bits Mask, not shown, a means for providing encryption of data, also simply known as ConfigBits) for the customer account, which is passed through the remainder of the system encapsulated with the actual message request. When the credentials have been verified, then the sender is authorised to issue a series of messages within the agreed limits of their contract. The format of these messages is arranged appropriate to the protocol with which they are bound, for example, HTTP or SMPP are two possibilities of many options.

Differential IP address blacklisting implementation can be, optionally, arranged to apply on different failure conditions. These conditions may occur at the network layer, or through correlation with events at a higher (business logic layer). These so-called security events may be arranged to comprise e.g. password failure and retries, scanning of UDP and TCP ports for open services, etc. Where an incoming IP address has invalid parameters, an IP address is, preferably, blacklisted for 1 second. Where there are invalid or failed passwords, then an IP address is, preferably, blacklisted for 5 seconds. The actual implementation of the blacklisting events are not limited to these timescales but can be arranged as required. Advantageously, such a differential strategy quenches well known 'dictionary attacks' against user names and passwords, while not overly penalising users who inadvertently included wrong parameters. The blacklisting mechanism is also susceptible to implementation concerning rating and payments. (An exemplary blacklisting process or method is discussed further below with reference to FIG. 8).

ConfigBits, also referred to as the CMB or ConfigBits Mask, are a set of characters in a string that indicate positionally and by value particular functionality and parameters for a given account. ConfigBits are a means of succinctly storing key data about the destination and routing of messages. Config Bits are added to the message ticket on initial receipt into the MTN. Advantageously, with the ConfigBits added to the message ticket, it is possible to diagnose issues after the transmission of the message.

The usual format of configbits is NNxxCCCC . . . CC where 'NN' indicates version number, 'xx' indicates the version marker and 'CCCC . . . CC' is a set of pairs of characters of no set length. Any pair of alphanumeric characters from [0-9a-zA-Z] can be used except 'x' which is reserved as a marking pair as for the version number. By convention the CCCC . . . CC character pairs are numbered from 0 upwards.

The sender may elect to transmit messages immediately, or set a timestamp at which the message be sent, which requires the message to be buffered on the MTN message transfer node e.g. arranged located in PMBD 91 for the required duration.

The sender may elect to send one or more messages, to one or more recipients. However, each message goes through a set of processing prior to being sent. Using the Config Bits (see definition below) to dictate the required steps, for this specific message request, each message passes through some or all of the available modular functions available, including, but not limited to, the Sourcing Module, the Routing Module, the Moderation Module, the Rating/Billing Module. In FIG. 2, the specific embodiment of the present invention illustrated shows actions taken for moderation 120, parse 130, and rate 140.

In Moderation 120, a message is checked for content in contravention of the appropriate moderation policy. In Parse or Parsing 130, the message is parsed or split into segments along the boundaries of the maximum message size for transmitting single or multi-part messages. Where a user has specified mail-merge 150 fields in his message and appropriate data is stored against that user, then the original message is used as a template for the generation of messages. In the Rate or Rating Step 140, each message that is sent is rated according to a tariff plan appropriate to the destination, route and quantity of messages, which are eventually transmitted 160. Finally, the message is transmitted through the carrier to the intended recipient and the process comes to an end 170.

The method as illustrated in FIG. 2 depicts the method of processing a message from an interface 70 70A through the MTN. It should be noted that the MTN releases a message destined for e.g. a carrier network by means of an interface (to delivery agent) 80, which is specifically equipped for such a purpose and which can preferably accept incoming messages returned from said carrier network, as discussed with reference to FIG. 3 below. It is also possible for the MTN to process a message from an interface (to send agent) 70 and return the message to the same "send" interface for delivery to e.g. another application. Thus interface 70 70A can be used independently for input and output between e.g. difference enterprise users and/or customers, such as call centres using eGain. Applications such as LivePerson are equally suitable for inclusion. An application can easily be added to the MTS by means of a suitable and additional 'translator' comprised in the interface 70 70A.

Known messaging systems require normalisation of message format and/or protocol before a message can be processed. This is a considerable restraint on the functioning of the messaging system. Legacy protocols are generally implemented which have remained unchanged for many years and, consequently, pose compatibility difficulties as methods and technologies develop with time. By contrast, MTN's according to embodiments of the present invention, utilise a common protocol, a unique generic language of the MTN, which is flexible and inventive. Current scripts allow definition and can accommodate expansion to new applications and protocols, as described above. An input message is preferably converted into a JSON object, which allows a chosen definition of object structure to suit the processing and functionality of the MTN. For example, a SMPP input transferred into a JSON object according to embodiments of the current invention, is then rendered in a optimum and desired format for further processing. This interim state also facilitates an easy translation from the JSON object into a different required protocol for delivery. Said translation may be achieved and implemented at either the interface to send agent (70 70A) or the interface to delivery agent (80 80a). Thus the transfer of messages between different applications can be achieved.

Referring to FIG. 3, the method comprises message transfer from a recipient back to a MTN according to an embodiment of the present invention. This figure comprises a specific, detailed example of one possible embodiment of the present invention.

FIG. 3 shows the flow of (return) messages, which are generated from the carrier side. Said messages are received at a delivery interface 80 80A located on the MTS 10 or MTN 20 22 23 24 25 26 27. Various types of messages are susceptible to such reception. Said messages may comprise Delivery receipts (DLR), which indicate the success or otherwise for the delivery of messages issued by the sender: these messages are normally generated by a receiving network. Said messages may also comprise messages generated by end users (for example, Mobile Originated messages) and, depending on the message, different actions may be taken. If a message relates to message originated to shortcode sender number, then the regulatory authority (in different countries) usually requires action to be taken by the operator (in this case, of the MTN). Where the message is not of this type, then the message has to be relayed back as a reply to a message sent previously by the sender.

An embodiment of the method of the present invention shown in FIG. 3 comprises a start 200 of availability to receive a communication or message by means of either the delivery agent interface of the MTS 80 or the MTN 80A, depending on how the system and MTN are operating (in combination or MTN autonomously). The method continues with listening for a connection from a carrier 210 (e.g. a network for facilitating SMS text messaging or a mobile network). Incoming text through the carrier 220 is facilitated. At this stage it is important to determine what kind of message has been received deciding if the incoming message is a delivery receipt 230 is facilitated and the result determines the subsequent actions of the MTN operation. If the message is not a delivery receipt, the MTN ascertains if the message is a stop request 240. If the message is not a stop request, the MTN then ascertains if the message is a Mobile Originated Message (MOM) 250. These three message types are considered the most important and likely types of messages to arrive at the MTN. Should the MTN not be able to categorise an incoming message under any of these three types, the process or method makes allowance for this by directing the message to be handled as an exception, Handle Exception 260.

If the message is identified as a Delivery Receipt in step 230, then the method allows for further enquiry, 'Has the business requested receipt?' 231. If such a request has been made, the method provides that the MTN supply said receipt in a format appropriate and desired by the business, 'Format Receipt for Business' 232. If no such request exists, then this is noted in the step 'Log Exception' 233.

A delivery receipt (discussed below by reference to FIG. 9) is a message with a standard format (e.g. version 3.4 of SMPP protocol): e.g. . . .
id:IIIIIIIII sub:SSS dlvrd:DDD submit date:YYMMDDhhmm done date:YYMMDDhhmm stat:DDDDDDD err:E
where:
   id is the message ID allocated to the message by the server.
   sub is the number of short messages originally submitted
   dlvrd is the number of short messages delivered
   submit date is the date and time at which the short message was submitted
   done date is the date and time at which the short message reached its final state
   stat is the final status of the message
   err is the network specific error code or an SMSC error code If the message is identified as a Stop Request in step 240, this is handled by the MTN in step 241, 'Handle Stop Request'.

The Module Handle Stop Request matches the content of a Message that has originated from a Mobile user for specific keywords. If there is a match, then the message is intercepted and not sent directly to the recipient. Instead, a matching action is executed by the Module, and a response is issued directly back to the Mobile user, confirming that the action has been taken. A message record is, preferably, created for this transaction. This process/method is further illustrated in FIG. 10.

Figure 11:
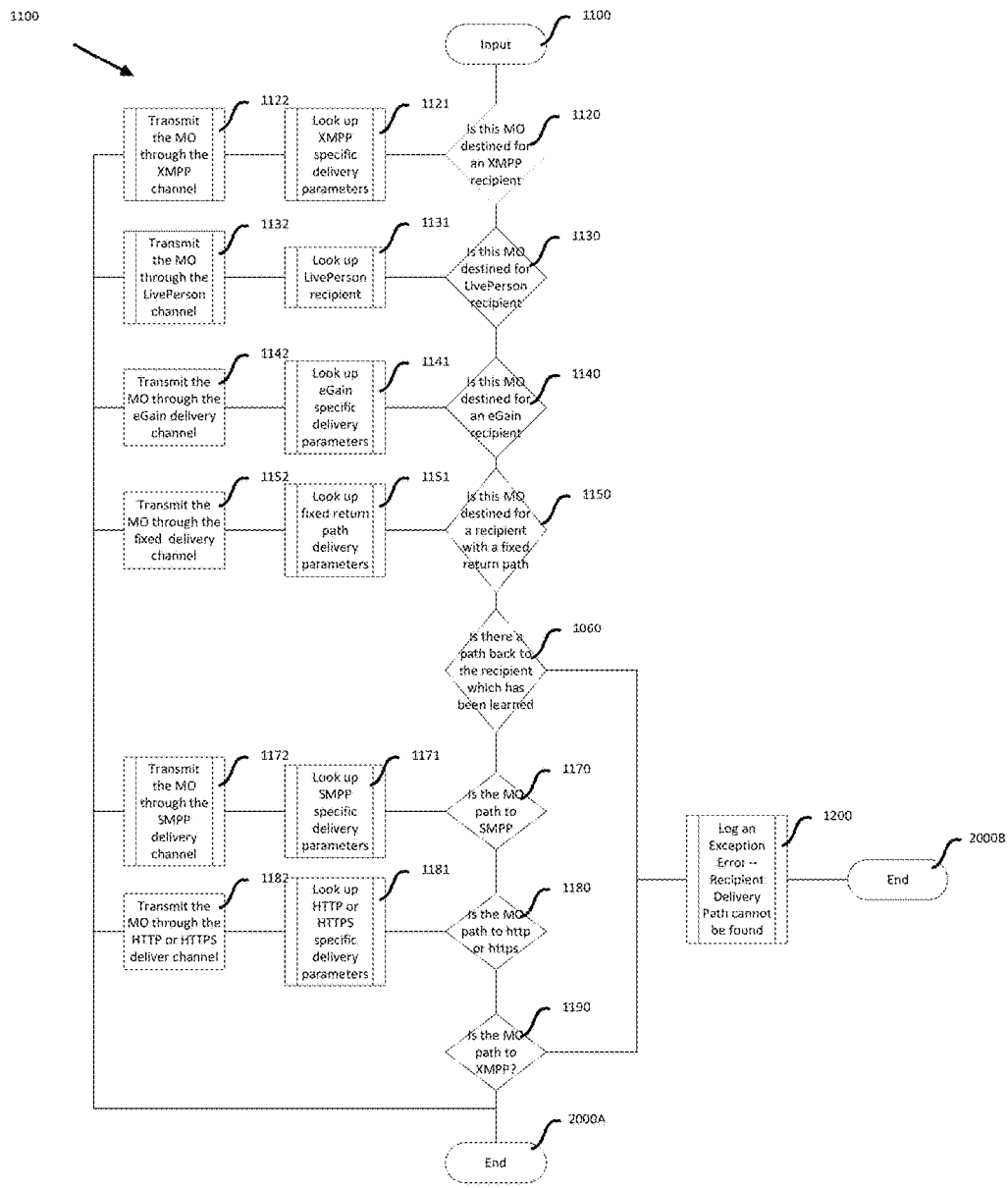

If the message is identified as a Mobile Originated Message in step 250, then the method allows for transmission of the Mobile Originated Message back to the Business by the MTN 251. The Module MO Delivery attempts to find the appropriate mechanism by which the MO message can be delivered to the intended recipient. This is usually performed by searching a sequence of rules. These rules provide the delivery parameters for the preferred channel, such as the channels username, address and other associated characteristics. A preferred method of implementation is shown in FIG. 11.

For the methods of both FIG. 2 and FIG. 3, an embodiment of the present invention comprises the use of in-memory counters (not shown), kept for system and service related events. Example of service events are incoming connects to the SMPP service point (i.e. interface) or delivery failures. Said in-memory counters record maximum, as a well as dynamic, rates, usually metered in counts per second. Rate-limiting decisions can be made by the message transfer system 10 to reject new connections to the system 10 based on exceeding dynamic rate thresholds, at the point of measurement. (Rate checks can be used to assess and control the access to a MTN and the control of MTN and/or MTS system usage). Forward or Backward Flow-control i.e. flow control of incoming messages for sending or the receipt of messages resulting from delivery of a message, can be implemented by rejecting connections at a point removed from the point of measurement. In other words, control checks can be implemented at the MTN in "mid-process" or "mid-flow" of a message from incoming to outgoing. Optionally, automatic checking is arranged in conjunction with desired business parameters.

These (in-memory) counters are implemented in the in-memory database e.g. PMBD 91. As these counters are normally implemented in real-time and potentially have the capability to lock the database, then the counting, rate-limiting and flow-control mechanisms are implemented using at least one stored procedure located in the in-memory database.

FIG. 4 illustrates message ticket information 400, according to an embodiment of the present invention. FIG. 4 shows two types of tickets related to the transmission of messages through the system. These are the Initial 410 and Final 420 tickets. The Final ticket is a superset of the Initial ticket in that it has all the information in the Initial ticket, and additional detail. The initial ticket is created when the message has been authenticated, validated and accepted into the system, but has not already been sent to the outbound carrier. The table shows the fields 430 contained in each of the ticket types. The fields can be categorized into sub categories 440, comprising for example Routing, Messaging, Moderation/Parsing, Quality of Service tracking, Debug and Rating.

Figure 5:
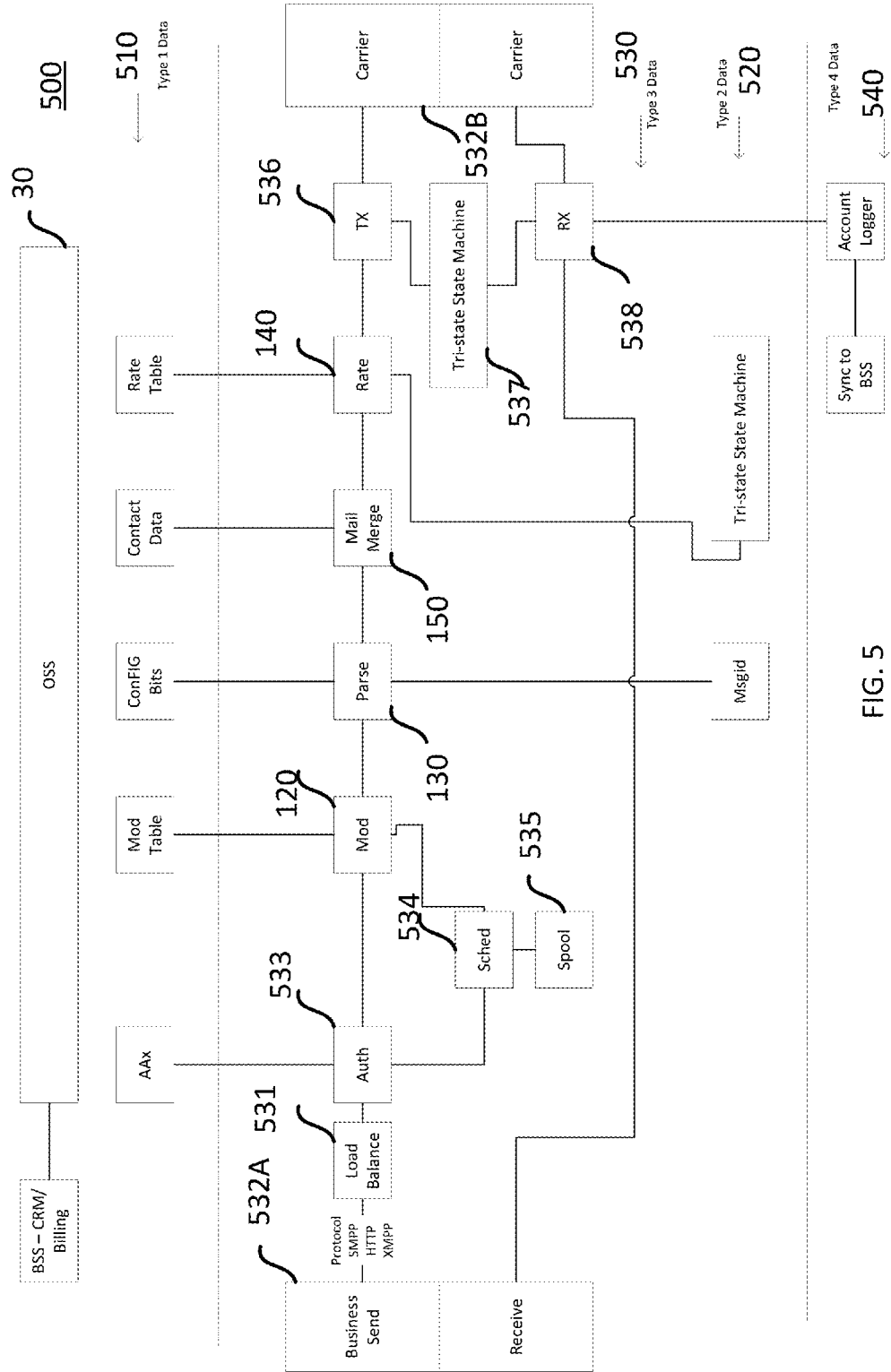
FIG. 5 is an illustration of a Data Flow view of an MTN, according to an embodiment of the present invention, and its data relationship/dependency with the other architectural components.

FIG. 5 is an illustration of the data flow of a MTN and the data relationship with other architectural components of the message transfer system, according to an embodiment of the present invention.

FIG. 5 illustrates a Data Flow 500 view of an MTN, according to an embodiment of the present invention, and its data relationship/dependency with the other architectural components. Different levels of data are profiled. Four types of data are shown in the figure and are discussed below: Type 1 data 510, Type 2 data 520, Type 3 data 530 and Type 4 data 540. In particular, Type 3 data 530 relates to the functioning of the MTN 20 22 23 24 25 26 27. A fifth type of data (Type 5) is known but is not illustrated in FIG. 5. This fifth type of data relates to configuration data and software, ordinarily stored in source control applications such as Github and Puppet (see later). Further, this data defines what switches are set to turn on/off functionality as well as to what level the functionality is scaled i.e. how many processes are running behind a load balancer.

The purpose of profiling levels of data is to group together data, according to requirements comprising e.g. the same level of availability, traffic volume, security, purpose and level of transience. The purpose of a data grouping refers to whether it relates to the primary provision of service, or if it performs more of a supporting functioning, i.e. used by 'back office' or business input system. Level of transience is defined as the degree to which data is permanent in the system. Messages, by their very nature and the preferred requirements of the message transfer system 10, are transient, with a lifetime related to the time taken to be transmitted and any subsequent delivery notifications to be received. The transience of a message at the MTN 20 22 23 24 25 26 27 is particularly important to facilitate the transience of a message and thereby enhance and improve the overall messaging system performance. By contrast, data recording that the transaction has taken place, might be stored for weeks, month or even years afterwards, depending on preference. Once data has been profiled, appropriate measures and controls can be put in place to assure the data is managed correctly, but not necessarily in an excessive manner. The level of appropriateness informs, for instance, the distributed nature of the system architecture. Such a ranking assists in the characterization of the overall system.

Type 3 data comprises service critical data, related to the transfer of messages through a MTN 20 22 23 24 25 26. Customer transmitted messages usually originate from a message sending application by way of connection to an external service point (not shown) on the Message Transfer Node (MTN) (or via the MTS interface). A Load-Balancer, which is arranged to facilitate use of increasing capacity (i.e. more modules) as needed. The Load Balance(r) 531 performs the mediation between input via module 532A from the external service point and the internal service modules, which are tuned to the particular service protocol that the customer is using. Currently, these protocols include HTTP, HTTPS, XMPP, SMPP, SOAP and XMLRPC.

As well as being arranged capable of handling data directed from a sender to a recipient, the MTN is also arranged capable of handling two types of Type 3 (also named, Level 3) data that is returned by, or on behalf of, a recipient. Firstly, the carrier returns delivery reports detailing the success or otherwise of the delivery of the original message to its intended recipient via module 532B. Secondly, the recipient can generate a response message (Mobile Originated) message for transmission back to the original sender. Level 3 return path information is needed to effect the successful relay of data back to the sender.

Other important Type 3 modules comprise: Auth 533, Sched 534, Spool 535, TX 536, Tri-state State Machine 537, Rx 538.

The Auth Module 533 authenticates incoming connections using the method appropriate to the particular protocol invoked, and is usually intrinsic to the functionality of the protocol. The Auth Module 533 either allows or rejects the acceptance of a message based on a positive or negative authentication respectively offered by the client. Some examples (though not an exhaustive list) of authentication methods used by the Auth Module 533 are the Basic Authentication (RFC 2617) which is part of the HTTP protocol, and System ID and Password which is part of the SMPP protocol (GSM Forum). The Sched Module 534 schedules the delivery of a message at the time and date in the future, specified by an optional parameter provided concurrent with the delivery of the message from the client. Where the optional parameter is not supplied, then the message is delivered immediately. The Spool Module 535 provides the message store for messages which are optional scheduled for future delivery. The Sched Module 534 deposits the message in the Spool Module 535 when it arrives from the client and retrieves the message when the future time arrives for delivery.

The TX Module 536 provides the terminating interface between the Message Transfer Node and the Carrier 532B which delivers the message to the mobile handsets. The TX Module 536 creates connections to the Carrier, which are then maintained for the duration of the transmission of the outgoing messages. In order to create an outbound connection, the TX Module 536 and the Carrier must exchange credentials. The TX Module 536 only transmits messages and does not receive messages. The TX module 536 updates ticket information with timing and usage information for the purpose of recording performance and customer utilisation information. The RX Module 538 provides the terminating interface between the Message Transfer Node and the Carrier which receives the message from the mobile handsets as well as from other network functions. These network functions include delivery receipt notifications indicating success, failure or lack of completion. The RX Module 538 creates connections to the Carrier 532B, which are then maintained for the duration of the transmission of the incoming messages. In order to create an outbound connection, the TX Module 536 and the Carrier 532B must exchange credentials. The RX Module 538 only receives messages and does not transmit messages. The TX module 536 updates ticket information with timing and usage information for the purpose of recording performance and customer utilisation information. The Tristate State Machine 537 correlates particular types of messages that are transmitted outbound through the TX Module and are received back through the RX Module 538. Typically these messages are Delivery Receipt Notifications received from the network pertaining to messages that were previously send to mobile handsets. The Tristate State Machine 537 assigns one of three states to an outbound message. A message in State 1 indicates that the message has been received from the client. A message in State 2 indicates that the message has been successfully sent out to a Carrier. A message in State 3 indicates that a Delivery notification has been received from the Carrier to indicate that the message has been successfully received by the intended recipient.

Type 1 is provisioning data, distributed by the OSS 30 system to all MTN nodes in the architecture. Once the MTN's have the Type 1 data, each MTN should be able to operate autonomously for a period of time. Type 1 data comprises data for authentication, authorisation, Moderation 120, Parsing 130 (including rulesets where appropriate), Mail Merging 150, Rating 140 and Routing.

The OSS 30 manages the provisioning of data out to the MTN's that is critical for the functioning of the service. This includes data for authentication, message rating and routing. Once the MTN's have the Type 1 data, each MTN is arranged capable of autonomous operation for a (chosen) period of time. A full bulk upload of Type 1 data is sent at predefined intervals (every day), or after particular events (system restarts or upgrades). Partial uploads of Type 1 data is effected when central provisioning data changes, for instance changes in customer records, rating or routing.

Static Provisioning comprises data related to overall system build and configuration data, which is stored in e.g. Yaml (a human readable data serialisation format), Github (control system GIT repository hosting service) and Puppet (automation of system administration for configuration management).

Embodiments of the present invention comprise use of various concepts, which are more fully outlined below.

Transactionality prevents duplication or loss of message, particularly where the Message Queue is handing over to consumers. Message producers create messages which message consumers accept messages. Without transactionality, message consumers might receive a message, and then fail meaning that the message is lost. With transactionality, the consumer must give a clear confirmation (ACK) that it has accepted the message, before the Message Queue finally relinquishes it. If the ACK is not received within a particular time limit, the message becomes a candidate to be delivered by another consumer. The consumer may issue a negative acknowledgment (NACK) to the Message Queue in instances where the service element has experienced an error or can't forward the message to its end-point.

Persistence and Statefulness is provided by an in-memory database modelled after a NOSQL database structure, rather than a traditional RDBMS structure. NOSQL stores data in hash structures, sets and queues. A NOSQL database provides a mechanism for storage and retrieval of data that is modeled in means other than the tabular relations used in relational databases. This has the benefit of being able to create memory stored structures in a flexible, scalable manner. The structure and the data is easily synchronised and distributed from a centralised master database to a large number of read-only slaves. All nodes within the MTN have a least one copy of the read-only database. This allows statistics and reporting to be performed efficiently against a local copy, which is always kept in synchronisation.

Various types of data kept in the in-memory database comprise tickets, event logs, counters and provisioning queues. The architecture uses in-memory stored procedures, which can be executed efficiently without recourse to external software scripting or program functions.

A rudimentary structure is implemented in the in-memory database to track the state of messages traversing the system. This is a three-state state machine. When a message is accept into the system, it is registered in state 1. When the message is sent out to the external carrier for delivery, the state of the message moves from state 1 to state 2. Lastly, when a report of the successful delivery is returned from the carrier, the message moves from state 2 to state 3. On entering state 3, a Final ticket is generated, and a confirmation of delivery is sent to the original sender. Using the three stage state machine (Tri-state State Machine 537), it is possible to track which messages are potentially stuck at stages 1 (accepted but not sent), or stage 3 (sent but for which there is no delivery).

The Proxy Agent is a process responsible for handling inbound (MO) messages, which may be new interactions, or replies to previously sent messages. The Proxy Agent algorithmically deduces what action, if any, to take with each MO. Messages containing pre-defined keywords/phone number combinations may be automatically replied to, based on the content of an in-memory table of such combinations and their responses. Messages not requiring automated responses are then examined based on destination number, where a destination number is associated with a specific client, the messages are assigned a routing element and encapsulated as a JSON object and passed to the central message queueing system for consumption by an instance of the Proxy Worker process. Where the destination number is not solely associated with a single client, but in fact may be shared across multiple clients, a mapping table is consulted, allowing the process to associate the message with the client currently associated with this source-destination combination, optionally as a result of a recent outbound (MT) message to this source number, from this destination number, by the client. Again, the deliverable form they algorithm is a JSON-encoded message, passed onto the central message queueing system.

The Proxy Worker is a process responsible for passing inbound (MO) messages to clients, following routing instructions contained within the JSON-encoded message produced and placed in queue by an instance of the Proxy Agent. The Proxy Worker can deliver the message to the client by any one, or multiple, means including, but not restricted to:

by HTTP to a URL
by SMTP to an email address
by XMPP to a JID
by SMS to an SMS-capable device
by Voice to a telephone number, using TTS (text to speech)

Preferably, all ingress, egress and internal traffic uses the Internet Protocol. This allows particular strategies to be invoked for the protection of resources within the system as well the provision of resilience of traffic flows. The network layer, the message queue and a low-latency in-memory data store are key to creating a resilient and scalable distributed architecture.

For in-coming message traffic, it is preferred that some services predominantly listen for incoming service connections off a nominated transport layer (either TCP or UDP) port address. For resilience, there are multiple copies of these services per physical server, of which there can be one or many servers. In order to scale horizontally, these services are positioned behind a load balancer which distributes traffic in an equitable manner. If one of the service entities becomes unavailable, the load balancer does not transmit traffic to this service entity. Service entities are stateless, and can fail without loss of data, nor loss of availability of the overall service. Data from incoming connections is generally passed to the centralised message queue, or stored in a distributed database.

For out-going message traffic, it is preferred outgoing services consume data from the Message Queue, and may forward the data to an external service entity or conduct some processing followed by re-queuing on the Message Queue. These service entities are stateless and can fail without loss of data, nor loss of availability of the overall service. Horizontal scaling is catered for because there may be one or many consumers for a given queue, however, the Message Queue ensures that a message is issued to one and only one consumer who's responsibility is to process the message and return a confirmation or ACK to the Message Queue. The consumer must give a clear confirmation (ACK) that it has accepted the message, before the Message Queue finally relinquishes it. If the ACK is not received within a particular time limit, the message becomes a candidate for delivery by another consumer. The consumer may issue a negative acknowledgment (NACK) to the Message Queue in instances where the service element has experienced an error or can't forward the message to its end-point Accounting and ticketing information is issued by each MTN node 20 22 23 24 25 26 to the central BSS 50 function. Each message that passes through an MTN generates an Initial ticket, once the message is accepted by the node, and then a Final ticket, once the message has been reported as delivered by the remote carrier. In the instance, where an MTN is disconnected from the BSS, the ticket information are buffered in the TicketQ.

Figure 6:
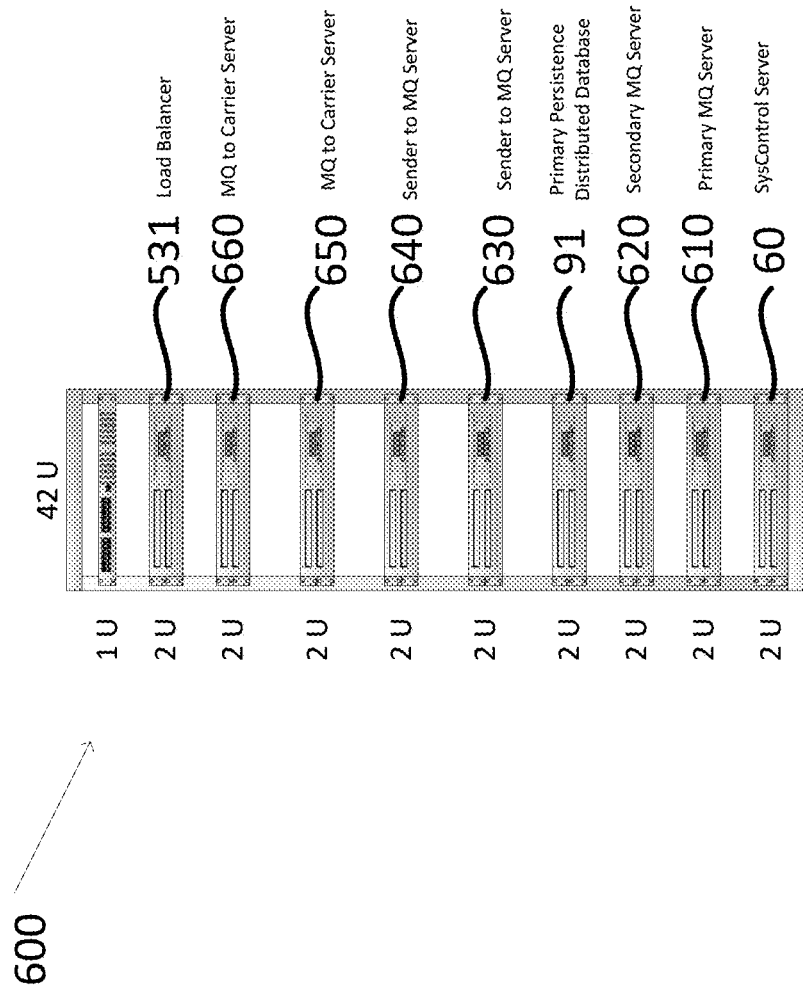
FIG. 6 is an illustration of a preferred physical embodiment of a MTN according to an embodiment of the present invention.

Referring now to FIG. 6 which is an illustration of a preferred physical embodiment of a MTN 600 according to the present invention. A possible implementation is shown in the figure and comprises a preferred implementation of embodiments of the present invention, including distinct physical computing servers for creation of an individual Message Transfer Node. Two separate servers are provided for the Message Queuing function. Primary MQ server is actively carrying traffic, while Secondary MQ server is standing by to carry traffic should the Primary MQ server stops functioning. Separate servers are provided each for the functions Load Balancer,SysControl and Persistent Distributed Databases. Duplicate servers MQ_to_Carrier) are provided handling outbound messages to Carriers. Duplicate servers (Sender to MQ) are provided handling inbound messages from clients. An important feature of the figure is the depiction of the Message Queue 90 split between a Primary MQ server 610 and a Secondary MQ server 620. Such an illustration is indicative of a split or distributed message queue functionality and arrangement according to embodiments of the present invention.

A preferred physical embodiment of a Message Transfer Node (MTN) 20 22 23 24 25 26, according to embodiments of the present invention, comprises certain key features. The servers are preferably implemented as Dell or HP quad core Intel processor, each with 64 GB of RAM, 500 Gb Disk and dual 1 Gbps Ethernet Network Interfaces. At the core of the MTN node, are the dual Redundant Message Queue services, running on separate servers. Both servers are preferably arranged in active-active configuration, with one server set in memory transaction mode, the other in persistent mode (synch'ing to disk). There is a separate server for the Persistent memory based database (PMBD) 91, which is preferably run in Read/Write mode. However, the database is synch'ed to every other server in the MTN, which maintains a read-only copy. Implementations, such as Redis, are benchmarked at thousands of transactions per second. There are dual servers for handling sender to Message Queue functions 630 640, and dual servers for handling Message Queue to Carrier 650 660 functionality. A distinct server is responsible for Syscontrol (MTN management) 60. A load balancer (and load balance method) 531 is run on a separate server. Ubuntu (14.04) is, preferably, the operating system, with configuration management preferably handled by Puppet.

Figure 7:
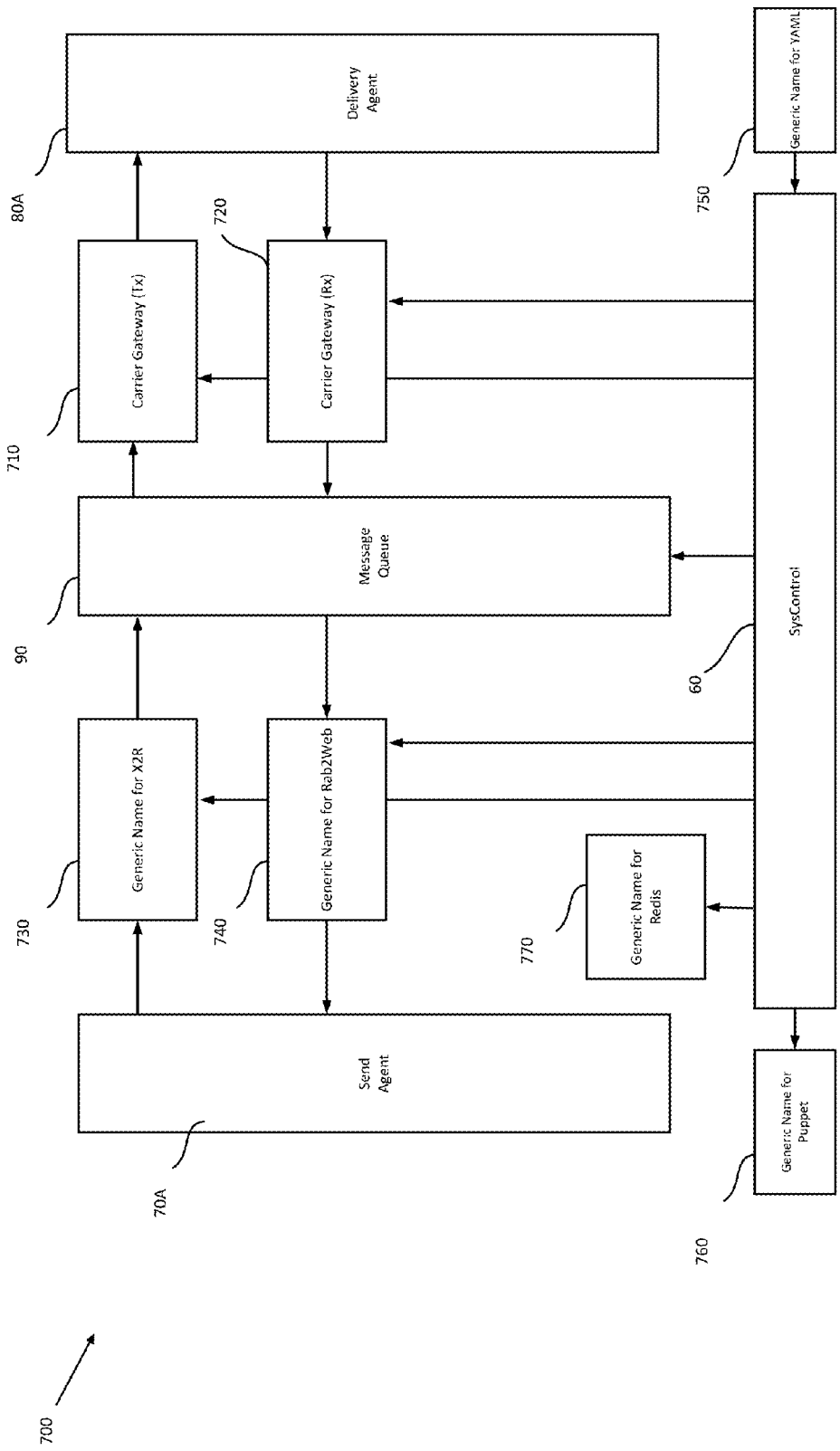
FIG. 7 is a schematic illustration of communication and/or operating processes and modules preferably comprised in an MTS according to an embodiment of the present invention.

Referring now to FIG. 7, this figure is a schematic illustration of communication and/or operating processes and modules 700 preferably comprised in a MTS according to an embodiment of the present invention. The Send Agent or send interface 70A, Message Queue 90 and Delivery Agent or delivery interface 80A, as identified and described above, are labeled in the figure. Further Carrier Gateway Processes 710 720 are shown, identifying with data processes 536 and 538, respectively. X2R output routines 730 and Rab2Web functionality 740 processes are shown in cooperation with transfer of information between Send Agent 70A and Message Queue 90. While the SysControl (SysC) module 60 is associated with management tools such as YAML 750, Puppet 760 and Redis 770, or their generic equivalents.

Figure 8:
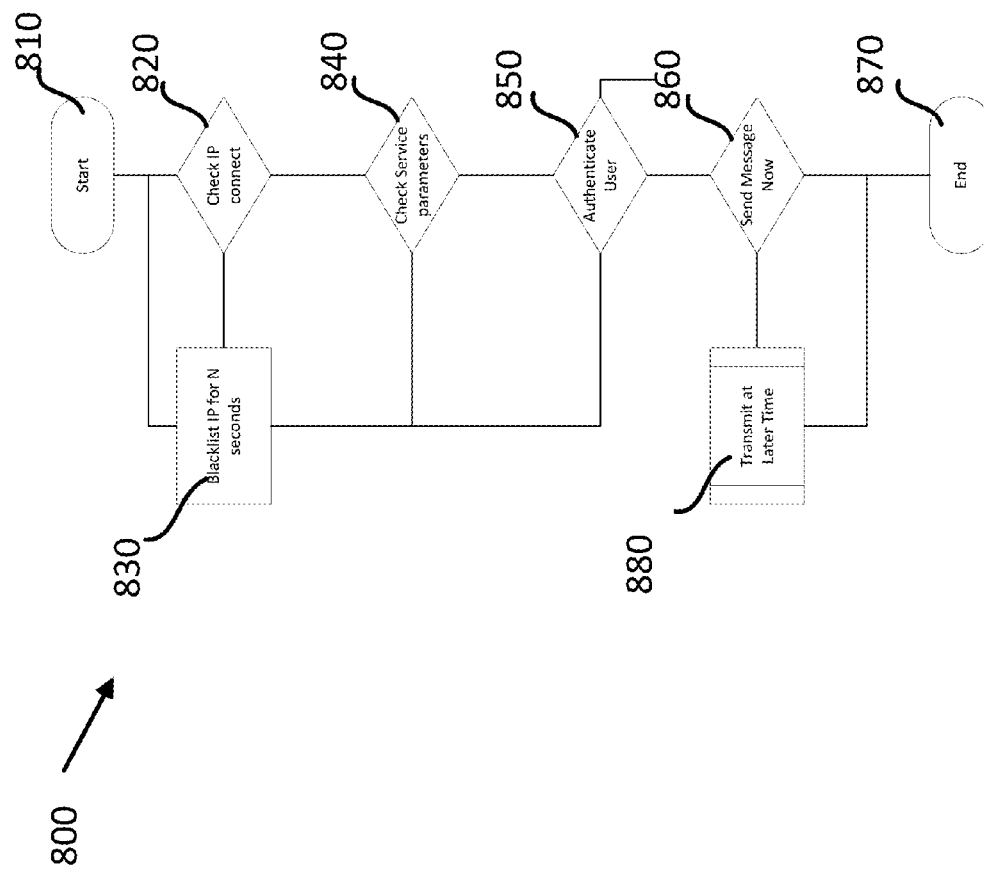
FIG. 8 is an illustration of an exemplary blacklisting process or method according to an embodiment of the present invention.

Referring now to FIG. 8, which illustrates an exemplary blacklisting process according to an embodiment of the present invention. The process or method associated with blacklisting of a user 800, e.g. by blocking access of an IP address to the MTN 20 22 23 24 25 26 27 or MTS 10, is initiated by Start 810. Checking the IP connect 820 follows to identify the requested connection. If the IP cannot be identified, the 'Blacklist IP for N seconds' 830 process is implemented. The chosen number of seconds etc., can be predefined for various scenarios according to business wishes and requirements or even by customer or user. It the IP is accepted, then service parameters are checked, 'Check Service Parameters' 840. Any failure is reverted immediately to a blacklisting 830 but success allows progression to an authentication step 'Authenticate User' 850. Should the authentication fail at this point, it is possible to revert to the blacklisting process 830.

If all steps above are met with success, then it is possible to send a message. Optionally, the message may be scheduled for a later delivery rather than an immediate sending. The option to Send Message Now 860 is assessed. For immediate sending, the action is completed and the sending process reaches an 'End' 870. Otherwise, the message is stored, as described above, to 'Transmit at a later Time' 880.

Figure 9:
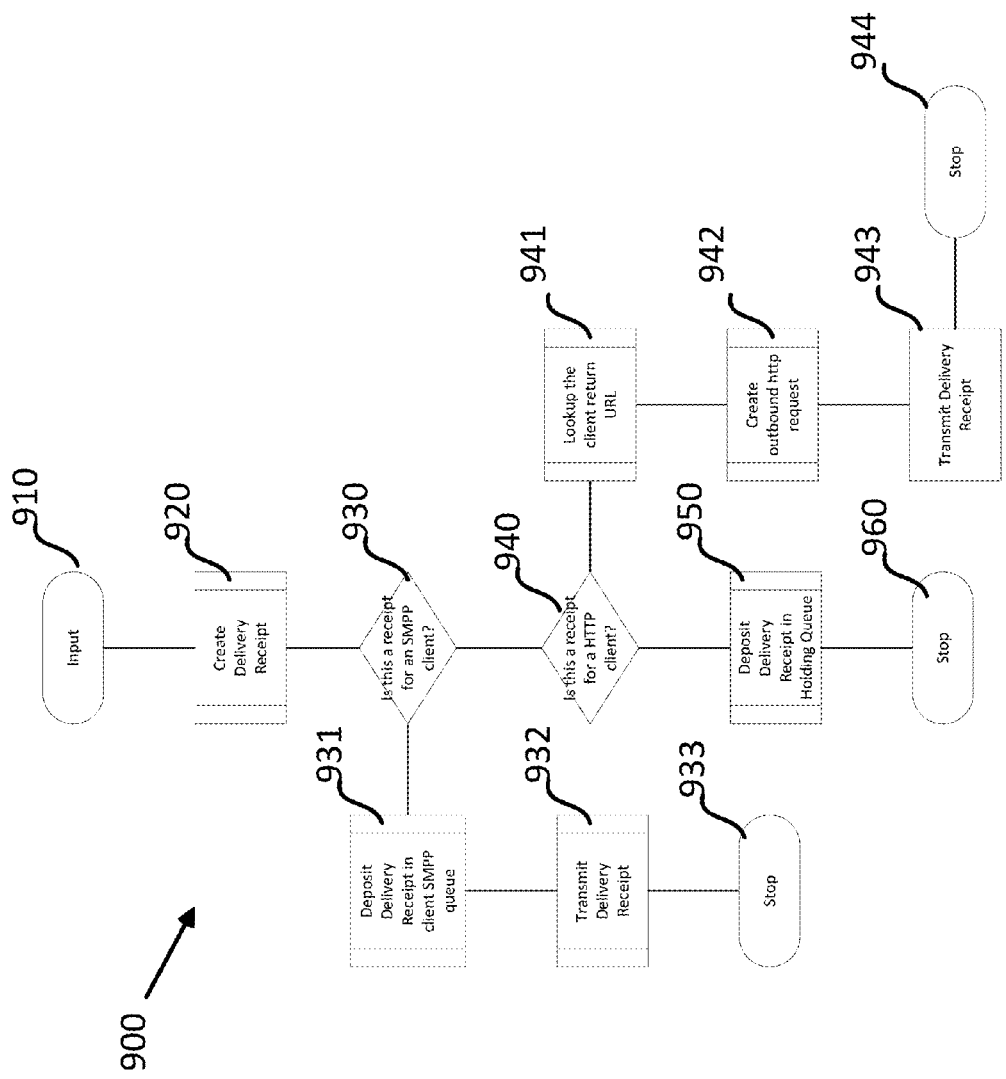
FIG. 9 is an illustration of a process or method or module for determination of a means of transmittal of a Delivery Receipt to a recipient, as implemented in an MTN according to an embodiment of the present invention.

Referring now to FIG. 9, FIG. 9 illustrates a process/method 900 for determination of a means of transmittal of a Delivery Receipt to a recipient, as implemented in an MTN according to an embodiment of the present invention. The figure illustrates a method or process started by means of an input 910 to the MTN, arranged to be implemented following the creation of a Delivery Receipt 920, for determination of the means by which the Delivery Receipt is transmitted.

It is determined if the recipient is an SMPP client in step 930. If the recipient is of type SMPP then the receipt is deposited in the recipient delivery queue in step 931, 'deposit delivery receipt in client SMPP queue'. If the SMPP recipient is logically connected to the MTN, as is normally the case, then the Delivery Receipt is transmitted immediately, as per step 932, 'transmit delivery receipt'. This then stops the process/method 933. If this is not the case, then the Delivery Receipt is transmitted on the next occasion that the recipient is connected.

If the recipient is of type HTTP (determined in step 940, 'is this a receipt for a HTTP client?'), then the return URL of the recipient is looked up in the Database (step 941, 'lookup the client return URL'), the Delivery receipt is encoded as a parameter in a HTTP POST request to the recipient's URL (step 942, 'create outbound http request). The Delivery Receipt is transmitted immediately (step 943, 'transmit delivery receipt). Transmission of the delivery receipt causes the process/method to stop 944.

If the recipient is not of type SMPP nor HTTP, or if the recipient is SMPP or HTTP but the Delivery Receipt cannot be delivered, then the Delivery Receipt is deposited in a holding queue 950 for further analysis by system administration staff, so as to determine the appropriate means of delivering the Delivery Receipt correctly. This causes the process/method to stop 960.

Figure 10:
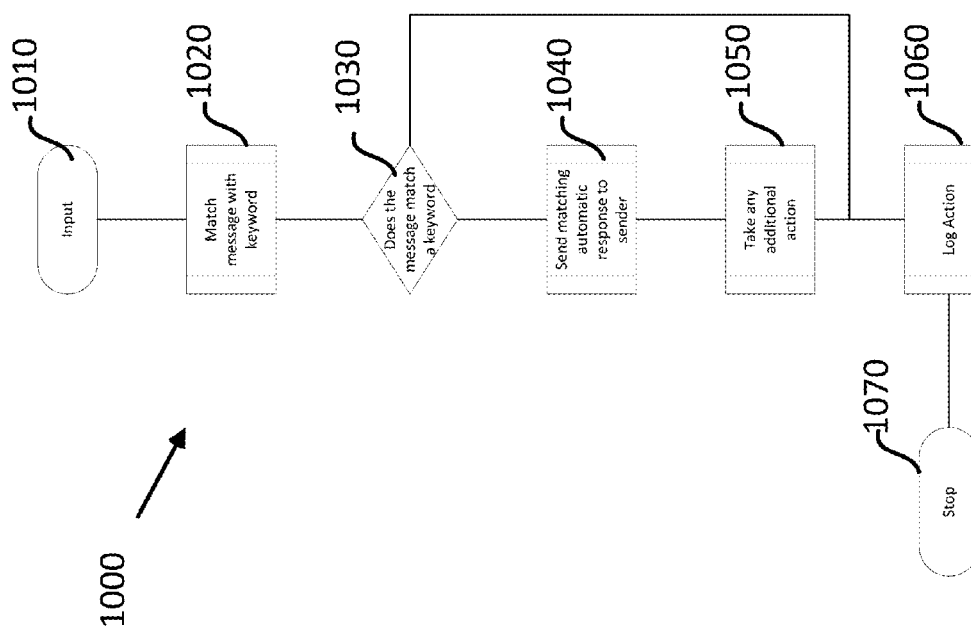
FIG. 10 is an illustration of a process or method or module for handling a stop request, as implemented in an MTN according to an embodiment of the present invention; and, FIG. 11 is an illustration of a process or method or module for delivery of a message to an intended recipient, as implemented in an MTN according to an embodiment of the present invention.

Referring now to FIG. 10, FIG. 10 illustrates a process/method for handling a stop request, as implemented in an MTN according to an embodiment of the present invention.

A method or process or module "Handle Stop Request" 1000, as illustrated in FIG. 10, matches the content of a Message originating from a Mobile user e.g. a delivery receipt, for specific keywords e.g. stop in a Stop Request. The stop request is given here by way of example but other keywords are suitable for implementation by such means. If there is a match, then the message is intercepted and not sent directly to the recipient. Instead, a (pre-determined) matching action (i.e. an action which is a desired response to finding an input matched to a known word) is executed by the Module, and a response is issued directly back to the Mobile user, confirming that the action has been taken. A message record is, preferably, created for this transaction.

The method 1000 comprises the steps of receiving an input (message) 1010 to the process. Action is taken to 'match message with keyword' 1020, the keyword (or words) being already present and known (pre-determined). An answer to the question, 'Does the message match a keyword?' 1030 is obtained. If yes, then the MTN device is instructed to 'send matching automatic response to sender' 1040 and to 'take any additional action' 1050, as per normal device operation. Any action taken is then logged 1060 by the device, for transfer to the MTS system and the process ends with a stop 1070. If a 'no' is returned at step 1030, then the process proceeds immediately to steps 1060 and 1070, for logging of action and stop, respectively.

Referring now to FIG. 11, FIG. 11 illustrates a process or method or module for delivery of a message to an intended recipient, as implemented in an MTN according to an embodiment of the present invention.

The Module (or process or method) MO Delivery 1100 attempts to find the appropriate mechanism by which an input 1110 MO (Mobile Originated) message can be delivered to the intended recipient. This is performed by searching a sequence of rules. These rules provide the delivery parameters for the preferred channel, such as the channels username, address and other associated characteristics. The method is outlined below in a particular sequence but this should not be considered as limiting, other rules may be added or the rules checked in a different order. If an affirmative response to a rule is achieved, then a predetermined and specific action is implemented.

Firstly, a search is conducted for a rule that delivers the MO message to the recipient through XMPP. Step 1120 determines, 'is this MO destined for an XMPP recipient?'. If this rule exists, then the recipient's XMPP username and domain are yielded (step 1121, 'look up XMPP specific delivery parameters'), and the MO message is delivered to the XMPP delivery module (step 1122, 'transmit the MO through the XMPP channel').

If this rule does not exist, then a search is conducted for a rule that delivers the MO message to the recipient through LivePerson. Step 1130, 'is this MO destined for LivePerson recipient?'. If this rule exists, then the recipient's Liveperson server, account identifier, application key are yielded (step 1131, 'look up LivePerson recipient') and the MO message is delivered to the Liveperson delivery module (step 1132, 'transmit the MO through the LivePerson channel').

If this rule does not exist, then a search is conducted for a rule that delivers the MO message to the recipient through eGain. Step 1140, 'Is this MO destined for an eGain recipient?'. If this rule exists, then the recipient's eGain server and entry point are yielded (step 1141, 'look up specific delivery parameters') and the MO message is delivered to the eGain delivery module (step 1142, 'transmit the MO through the eGain delivery channel').

The examples above of integration with third party services, i.e. XMPP, LivePerson and eGain, are illustrations of possible connections by means of embodiments of the present invention. These examples should not be considered as limiting. Other integrations may be incorporated as desired. Specifically, other examples comprise: WhatsApp, Twitter, Facebook, Messager, Wechat.

If this rule does not exist, then a search is conducted for a rule that delivers the MO message to the recipient through a hard coded route. Step 1150, 'is this MO destined for a recipient with a fixed return path?'. If this rule exists, then the recipient's credentials are yielded (step 1151, 'look up fixed return path delivery parameters') and the MO message is delivered to the desired delivery module (step 1152, 'transmit the MO through the fixed delivery channel'). Hard coded routes are used to enforce a particular mechanism by which the MO message is delivered to the recipient.

If the hard coded rule does not exist, then a search is conducted for a rule that delivers the module has learned through a previous MO transmission. Step 1160, 'is there a path back to the recipient which has been learned?'. If this rule exists, then the recipient's credentials are yielded, and the MO message is delivered to the desired delivery module.

If this rule does not exist, then a search is conducted for a rule that delivers the MO message to the recipient through SMPP. Step 1170, 'is the MO path to SMPP?'. If this rule exists, then the recipient's SMPP system ID, server and credentials are yielded (step 1171, 'look up SMPP specific delivery parameters') and the MO message is delivered to the SMPP delivery module (step 1172, 'transmit the MO through the SMPP delivery channel').

If this rule does not exist, then a search is conducted for a rule that delivers the MO message to the recipient through HTTP or secure HTTPS. Step 1180, 'is the MO path to http or https?'. If this rule exists, then the recipient's URL and HTTP POST or GET method are yielded (step 1181, 'look up HTTP of HTTPS specific delivery parameters') and the MO message is delivered to the HTTP delivery module (step 1182, 'transmit the MO through the HTTP or HTTPS deliver channel).

If this rule does not exist, the a search is conducted for a rule that delivers the message through XMPP. Step 1190, 'is the MO path to XMPP?'.

When a rule is found which is satisfied and transmission has occurred, the process ends 2000A.

At steps 1160 and 1190, the method allows for the return of an error log exception (step 1200, 'log an exception error recipient delivery path cannot be found') before the process comes to an end 20008.

Although embodiments of the invention are described in the foregoing, it will be appreciated that the present invention is also susceptible to being implemented in a variety of ways and comprising different individual features of the aforementioned embodiments.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural. Numerals included within parentheses in the accompanying claims are intended to assist understanding of the claims and should not be construed in any way to limit subject matter claimed by these claims.

LIST OF REFERENCE NUMERALS

10 message transfer system (MTS)
20 message transfer node (MTN)
21 message transfer node group
22 MTN 1
23 MTN 2
24 MTN n
25 MTN A
26 MTN B
27 MTN C
30 operations support system (OSS)
40 balance management (BM)
50 business support system (BSS)
60 system control (SysC)
70 interface (to send agent)
70A interface (to send agent) located on MTN
80 interface (to delivery agent)
80A interface (to delivery agent) located on MTN
90 Message Queue (MQ)
91 persistent memory based database (PMBD)
100 method step: input
110 method step: Bind with Credentials
120 method step: Moderate
130 method step: Parse
140 method step: Rate
150 method step: Mail Merge
160 method step: Transmit Message
170 method step: End
200 method step: start
210 method step: Listen for connection from Carrier
220 method step: Incoming Text through Carrier
230 method step: Is this a Delivery Receipt?
231 method step: Has the Business requested Receipt?
232 method step: Format Receipt for Business
233 method step: Log Exception
240 method step: Is this a Stop Request?
241 method step: Handle Stop Request
250 method step: Is this a Mobile Originated Message?
251 method step: Transmit MO message back to Business
260 method step: Handle Exception
400 message ticket information
410 Initial ticket
420 Final ticket
430 fields contained in each of the ticket types
440 categorisation into subcategories
500 Data flow view
510 Type 1 data
520 Type 2 data
530 Type 3 data
531 Load Balance
532A module
532B module
533 Auth
534 Sched
535 Spool
536 Tx
537 Tri-state State Machine
538 Rx
540 Type 4 data
600 Physical embodiment of an MTN
610 Primary MQ
620 Secondary MQ
700 communication and/or operating processes and modules preferably comprised in a MTS
710 Carrier Gateway Tx
720 Carrier Gateway Rx
730 Generic name for X2R
740 Generic name for Rab2Web
750 Generic name for YAML
760 Generic name for Puppet
770 Generic name for Redis
800 process or method associated with blacklisting of a user
810 Start
820 Check IP connect
830 Blacklist IP for N seconds
840 Check Service Parameters
850 Authenticate User
860 Send Message Now
870 End
880 Transmit at Later Time 900 process or method associated with determination of a means of transmittal of a Delivery Receipt to a recipient
910 input
920 create delivery receipt
930 is this a receipt for an SMPP client?
931 deposit delivery receipt in client SMPP queue
932 transmit delivery receipt
933 stop
940 is this a receipt for a HTTP client?
941 lookup the client return URL
942 create outbound http request
943 transmit delivery receipt
944 stop
950 deposit delivery receipt in Holding Queue
960 stop
1000 input
1010 Match message with keyword
1020 Does the message match a keyword?
1030 Send matching automatic response to sender
1040 Take any additional action
1050 Log action
1060 Stop
1100 input
1120 is this MO destined for an XMPP recipient?
1121 look up XMPP specific delivery parameters
1122 transmit the MO through the XMPP channel
1130 is this MO destined for LivePerson recipient?
1131 look up LivePerson recipient
1132 transmit the MO through LivePerson channel
1140 is this MO destined for an eGain recipient?
1141 look up eGain specific delivery parameters
1142 transmit through the eGain delivery channel
1150 is this MO destined for a recipient with a fixed return path?
1151 look up fixed return path delivery parameters
1152 transmit the MO through the fixed delivery channel
1160 is there a path back to the recipient which has been learned?
1170 is the MO path to SMPP?
1171 look up SMPP specific delivery parameters
1172 transmit the MO through the SMPP delivery channel
1180 is the MO path to http or https
1181 look up HTTP or HTTPS specific delivery parameters
1182 transmit the MO through the HTTP or HHTPS deliver channel
1190 is the MO path to XMPP?
1200 log an exception error recipient delivery path cannot be found
2000 A B end

The invention claimed is:

1. A message transfer system (10) comprising: a first interface (70), arranged to facilitate an input of at least one message to the message transfer system, the first interface (70 70A) is arranged to comprise a first translator, arranged as one or more of capable of translating an input format of the at least one message to a JavaScript (JSON) object after the input to the message transfer system (10) and capable to translate the JSON object to an output format before the output of the at least one message from the message transfer system (10), a second interface (80), arranged to facilitate an output of the at least one message from the message transfer system, a message queue, arranged to facilitate a processing of the at least one message through the message transfer system (10) between the first interface (70) and the second interface (80), wherein, the message transfer system (10) further comprises: an operations support system (30), for provisioning of data to a persistent memory database (91) of a message transfer node (20 22 23 24 25 26 27), said provisioning data being associated with the processing of the at least one message; and, a message transfer node (20 22 23 24 25 26 27), arranged to comprise the message queue (90) such that the message queue (90) is arranged as distributed.

2. A message transfer system (10) as claimed in claim 1, wherein the message queue (90) is arranged as one or more of:
   distributed across a plurality of physical servers (610),
   distributed across a plurality of virtual servers (620), and
   arranged as located across disparate geographical domains.

3. A message transfer system (10) as claimed in claim 1, wherein one or more of the first interface (70A) and the second interface (80A) are arranged located on the message transfer node (20).

4. A message transfer system (10) as claimed in claim 1, wherein the first interface (70 70A) is further arranged to facilitate the output of a message from the message transfer system.

5. A message transfer system (10) as claimed in claim 1, wherein the message transfer system (10) further comprises at least one of: a balance management (40), a business support system (50) or a system control (60).

6. A message transfer system (10) as claimed in claim 5, wherein the system control (60) is arranged capable of stopping, starting and monitoring of all subsystems within the message transfer node (20 22 23 24 25 26 27).

7. A message transfer system (10) as claimed in claim 1, wherein said at least one data input comprises provisioning data for a functioning of a messaging service of the message transfer system (10).

8. A message transfer system (10) as claimed in claim 7, wherein said provisioning data comprises at least one of: authentication data, message rating data, routing data, balance or credit information.

9. A message transfer system (10) as claimed in claim 1, wherein the message transfer node (20 22 23 24 25 26 27) is arranged capable of short-term autonomous operation based on the at least one data input.

10. A message transfer system (10) as claimed in claim 1, wherein the message transfer system (10) comprises a plurality of message transfer nodes (20 22 23 24 25 26 27), each message transfer node (20 22 23 24 25 26 27) being further arranged as individually cooperative with the message transfer system (10) and independent of each other.

11. A message transfer system (10) as claimed in claim 10, wherein the message transfer system (10) is arranged to facilitate allocation of a preferred message transfer node comprised in the plurality of message transfer nodes, according to a system user preference.

12. A message transfer system (10) as claimed in claim 10, wherein the message queue (90) is arranged as distributed across the plurality of message transfer nodes.

13. A message transfer system (10) as claimed in claim 10, wherein the plurality of message transfer nodes (20 22 23 24 25 26 27) are arranged as a group (21).

14. A message transfer system (10) as claimed in claim 1, wherein the second interface (80 80A) is further arranged to comprise a second translator, arranged capable to translate the JSON object to an output format before the output of the at least one message from the message transfer system (10).

15. A message transfer system (10) as claimed in claim 14, wherein the input format is not the same as the output format.

16. A message transfer system (10) as claimed in claim 1, wherein the persistent memory based database (91) is arranged capable of accepting and storing at least one data input from the operations support system (30) comprised in the message transfer system (10).

17. A method of transferring messages comprising the steps of: facilitating an input of at least one message to the message transfer system (10) by means of a first interface (70);

facilitating an output of the at least one message from the message transfer system (10) by means of a second interface (80); processing of the at least one message by means of a message queue through the message transfer system (10) between the first interface (70) and the second interface (80); providing an operations support system (30), persistent memory database (91) and a message transfer node (20 22 23 24 25 26 27) in the message transfer system; translating, by means of a first translator at the first interface (70 70A), an input format of the at least one message to a JavaScript (JSON) object after the input to the message transfer system (10); progressing the JSON object through the message transfer node (20 22 23 24 25 26 27); translating, by means of the first translator at the first interface (70 70A) or by means of a second translator at the second interface (80 80A), the JSON object to an output format before the output of the at least one message from the message transfer system (10); arranging the operations support system (30) for provisioning of data to the persistent memory database (91) of the message transfer node (20 22 23 24 25 26 27), said provisioning data being associated with the processing of the at least one message; and, arranging the message transfer node (20 22 23 24 25 26 27) to comprise the message queue (90); arranging the message queue (90) as distributed.

18. A method of transferring messages as claimed in claim 17, further comprising the step of:—
arranging the message queue as one or more of:
distributed across a plurality of physical servers (610), distributed across a plurality of virtual servers (620), and arranged as located across disparate geographical domains.

19. A method of transferring messages as claimed in claim 17, further comprising the step of: arranging one or more of the first interface (70A) and the second interface (80A) as located on the message transfer node.

20. A method of transferring messages as claimed in claim 17, further comprising the step of: arranging the first interface (70 70A) to facilitate the output of a message from the message transfer system.

21. A method of transferring messages as claimed in claim 17, further comprising the step of:—
arranging the message transfer system (10) to further comprise at least one of:
a balance management (40), a business support system (50) or a system control (60).

22. A method of transferring messages as claimed in claim 21, further comprising the step of:—
arranging the system control (60) capable of stopping, starting and monitoring of all subsystems within the message transfer node (20 22 23 24 25 26 27).

23. A method of transferring messages as claimed in claim 17, further comprising the step of:—
arranging the persistent memory based database (91) capable of accepting and storing at least one data input from the operations support system (30) comprised in the message transfer system (10).

24. A method of transferring messages as claimed in claim 23, further comprising the step of:—
arranging said at least one data input comprising provisioning data, critical for a functioning of a messaging service of the message transfer system (10).

25. A method of transferring messages as claimed in claim 24, further comprising the step of:—
arranging said provisioning data to comprise at least one of: authentication data, message rating data, routing data, balance or credit information.

26. A method of transferring messages as claimed in claim 23, further comprising the step of:—
arranging the message transfer node (20 22 23 24 25 26 27) capable of short-term autonomous operation based on the at least one data input.

27. A method of transferring messages as claimed in claim 17, further comprising the step of:—
arranging the message transfer system (10) to comprise a plurality of message transfer nodes (20 22 23 24 25 26 27), each message transfer node (20 22 23 24 25 26 27) being further arranged as individually cooperative with the message transfer system (10) and independent of each other.

28. A method of transferring messages, as claimed in claim 27, further comprising the step of:—
arranging the message transfer system (10) to allocate a preferred message transfer node, according to a system user preference.

29. A method of transferring messages, as claimed in claim 27, further comprising the step of:—
arranging the message queue (90) as distributed across a plurality of message transfer nodes.

30. A method of transferring messages as claimed in claim 27, wherein the plurality of message transfer nodes (20 22 23 24 25 26 27) is arranged as a group (21).

31. A method of transferring messages as claimed in claim 17, wherein the input format is not the same as the output format.

32. A non-transitory machine readable data storage media storing machine readable instructions, the machine readable instructions comprising a software product, characterized in that said software product is executable upon computing hardware for implementing a method as claimed in claim 17.

33. A message transfer system (10) comprising: a first interface (70), arranged to facilitate an input of at least one message to the message transfer system, the first interface (70 70A) is arranged to comprise a first translator, arranged as capable of translating an input format of the at least one message to a JavaScript (JSON) object after the input to the message transfer system (10), a second interface (80), arranged to facilitate an output of the at least one message from the message transfer system, the second interface (80 80A) is arranged to comprise a second translator, arranged capable to translate the JSON object to an output format before the output of the at least one message from the message transfer system (10), a message queue, arranged to facilitate a processing of the at least one message through the message transfer system (10) between the first interface (70) and the second interface (80), wherein, the message transfer system (10) further comprises: an operations support system (30), for provisioning of data to a persistent memory database (91) of a message transfer node (20 22 23 24 25 26 27), said provisioning data being associated with the processing of the at least one message; and, a message transfer node (20 22 23 24 25 26 27), arranged to comprise the message queue (90) such that the message queue (90) is arranged as distributed.

* * * * *

UNITED STATES PATENT AND TRADEMARK OFFICE
CERTIFICATE OF CORRECTION

PATENT NO. : 9,923,956 B2
APPLICATION NO. : 15/072440
DATED : March 20, 2018
INVENTOR(S) : Anthony Cahill et al.

Page 1 of 1

It is certified that error appears in the above-identified patent and that said Letters Patent is hereby corrected as shown below:

At Line 10 of Column 24, please insert --(-- immediately before "MQ_to_Carrier)"

At Line 32 of Column 27, please remove "20008." and replace it with "2000B."

Signed and Sealed this
Ninth Day of October, 2018

Andrei Iancu
*Director of the United States Patent and Trademark Office*